United States Patent
Barnes et al.

(10) Patent No.: US 12,461,170 B2
(45) Date of Patent: Nov. 4, 2025

(54) MULTI-FUNCTION END EFFECTOR AND METHOD FOR TESTING THE ELECTRICAL CONTINUITY BETWEEN A STRUCTURE AND A FASTENER

(71) Applicant: The Boeing Company, Arlington, VA (US)

(72) Inventors: Charles E. Barnes, Glen Mills, PA (US); Matthew A. Carney, Broomall, PA (US)

(73) Assignee: The Boeing Company, Arlington, VA (US)

( * ) Notice: Subject to any disclaimer, the term of this patent is extended or adjusted under 35 U.S.C. 154(b) by 260 days.

(21) Appl. No.: 18/454,009

(22) Filed: Aug. 22, 2023

(65) Prior Publication Data

US 2025/0067818 A1 Feb. 27, 2025

(51) Int. Cl.
*G01R 31/54* (2020.01)
*B25J 15/00* (2006.01)
*G01R 27/02* (2006.01)

(52) U.S. Cl.
CPC .......... *G01R 31/54* (2020.01); *B25J 15/0019* (2013.01); *G01R 27/02* (2013.01)

(58) Field of Classification Search
CPC ........ G01R 27/00; G01R 27/02; G01R 31/00; G01R 31/50; G01R 31/54; B25J 15/00; B25J 15/0019
USPC .......................... 324/600, 649, 691, 722, 724
See application file for complete search history.

(56) References Cited

U.S. PATENT DOCUMENTS

| | | | | |
|---|---|---|---|---|
| 4,089,728 A | * | 5/1978 | Teed | A61F 13/15772 156/352 |
| 4,838,097 A | * | 6/1989 | Shimai | A44B 19/60 73/865.9 |
| 6,606,252 B1 | * | 8/2003 | Snider | H05K 1/0268 174/262 |
| 6,949,055 B2 | | 9/2005 | Ferrari et al. | |
| 9,943,913 B2 | | 4/2018 | Everson | |
| 11,534,921 B2 | | 12/2022 | Barnes | |

FOREIGN PATENT DOCUMENTS

| | | | | |
|---|---|---|---|---|
| CN | 114323520 A | * | 4/2022 | G01M 7/02 |
| CN | 115465662 A | * | 12/2022 | B65G 47/91 |

OTHER PUBLICATIONS

Everhart, "Neighboring Mobile Robot Cell with Drilling and Fastening," SAE Technical Paper, published Sep. 19, 2017.
BCD Electronics, "M1 Milliohm Meter Specifications," retrieved on Jun. 25, 2023.

* cited by examiner

Primary Examiner — Hoai-An D. Nguyen

(57) ABSTRACT

An end effector has an end effector frame configured to be mounted to a movable platform capable of positioning the end effector relative to a structure. In addition, the end effector has a plurality of process tools mounted to the end effector frame and having different functional capabilities associated with hole formation and fastener installation in the structure. Furthermore, the end effector has a continuity tester configured to determine the existence of an uninterrupted electrical path between a fastener and the structure after installation of the fastener.

20 Claims, 21 Drawing Sheets

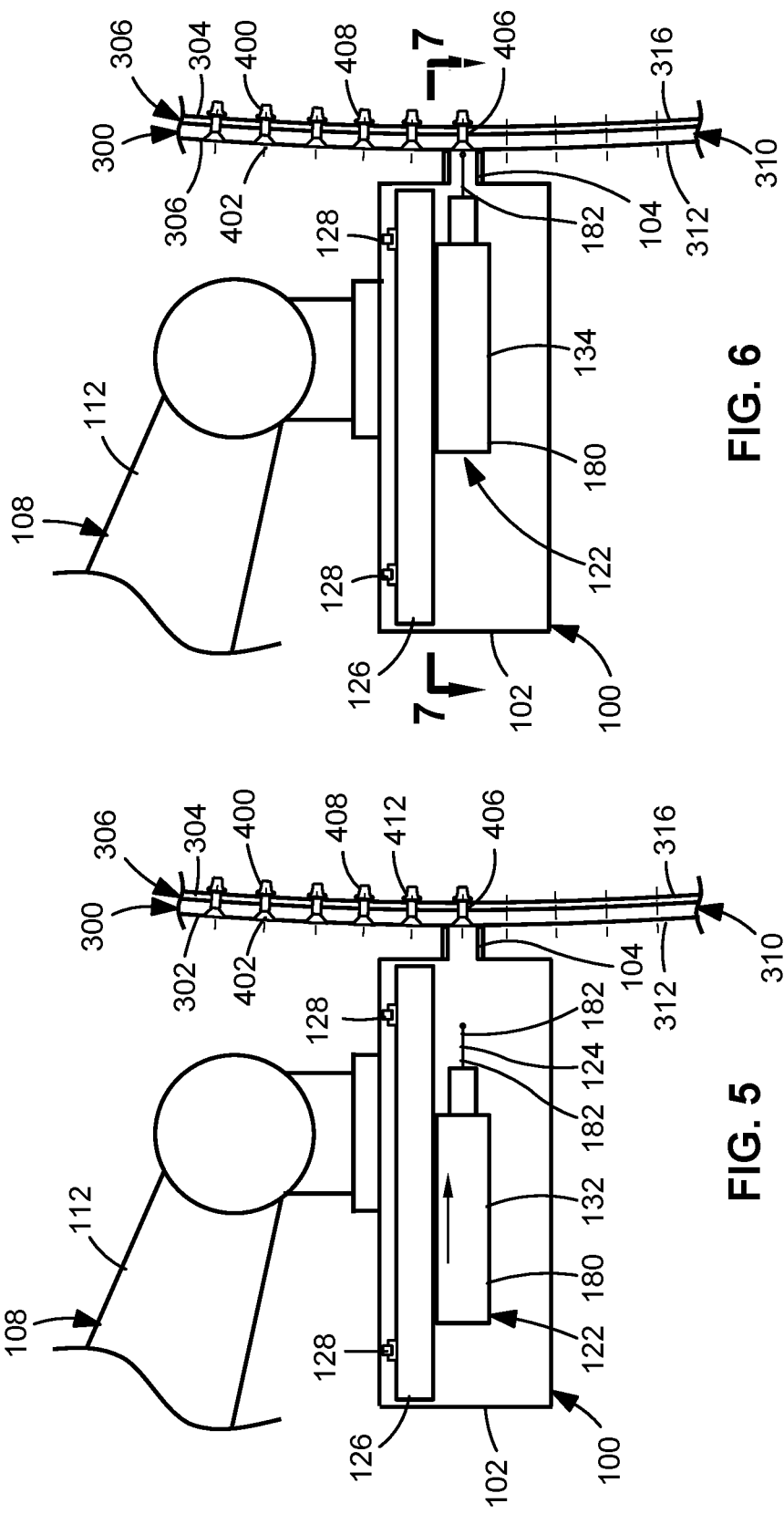

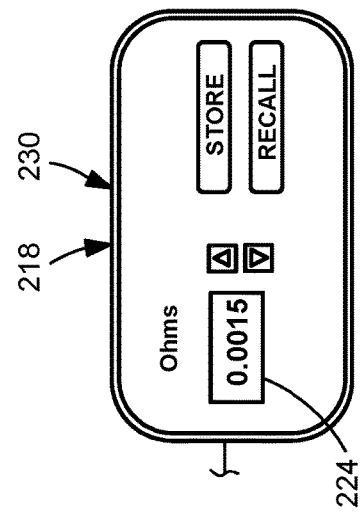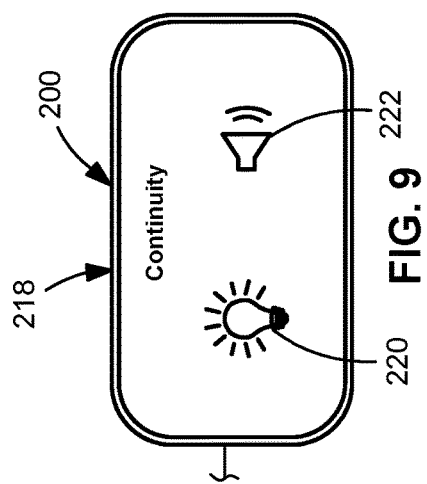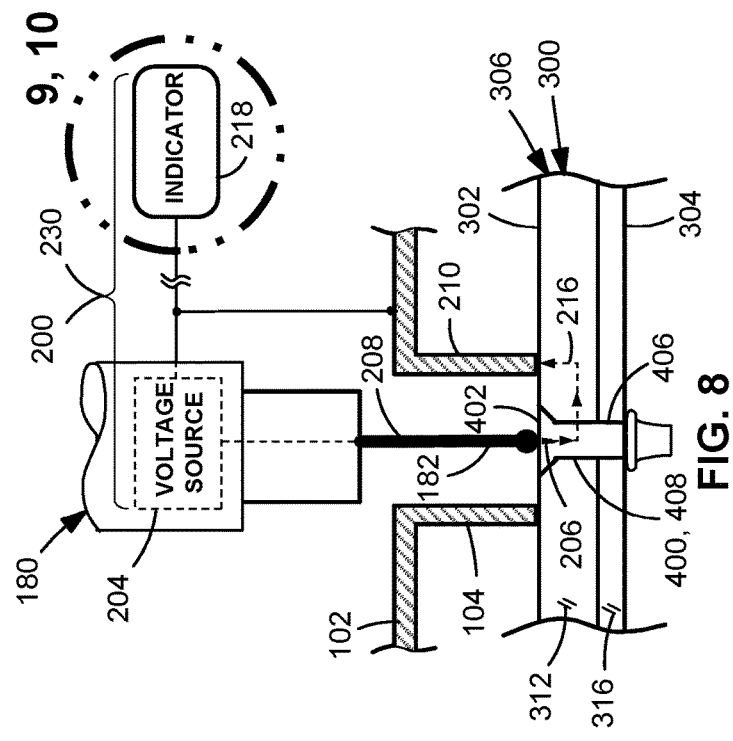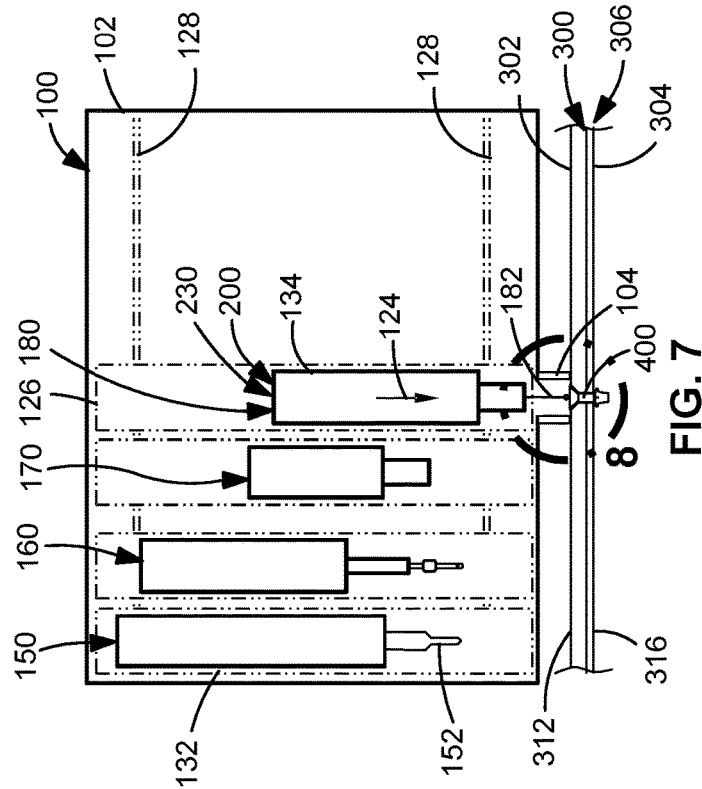

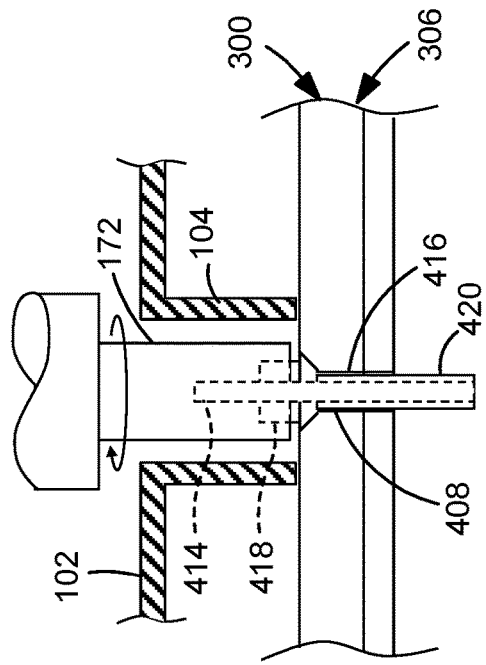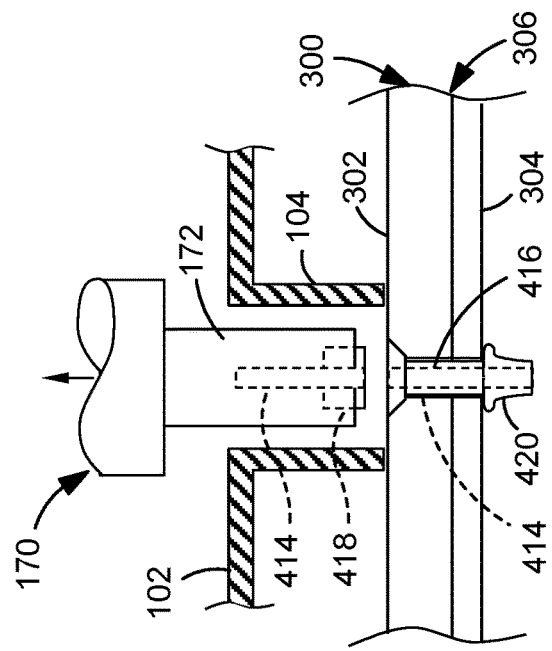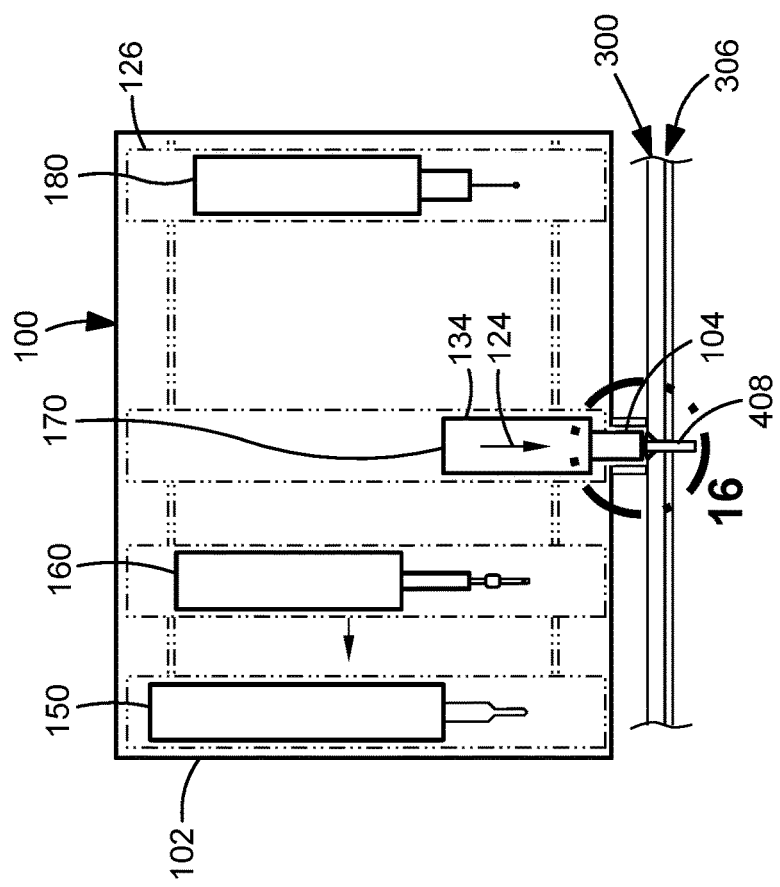

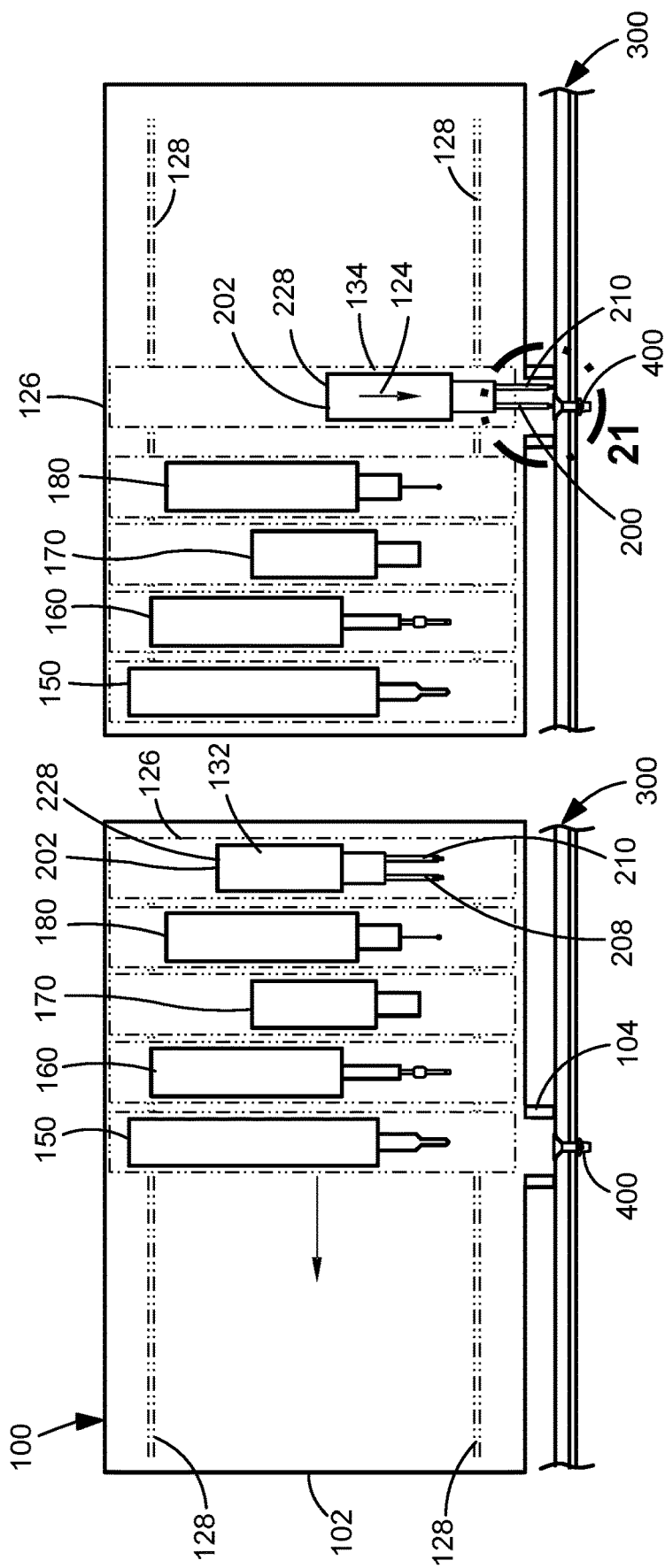

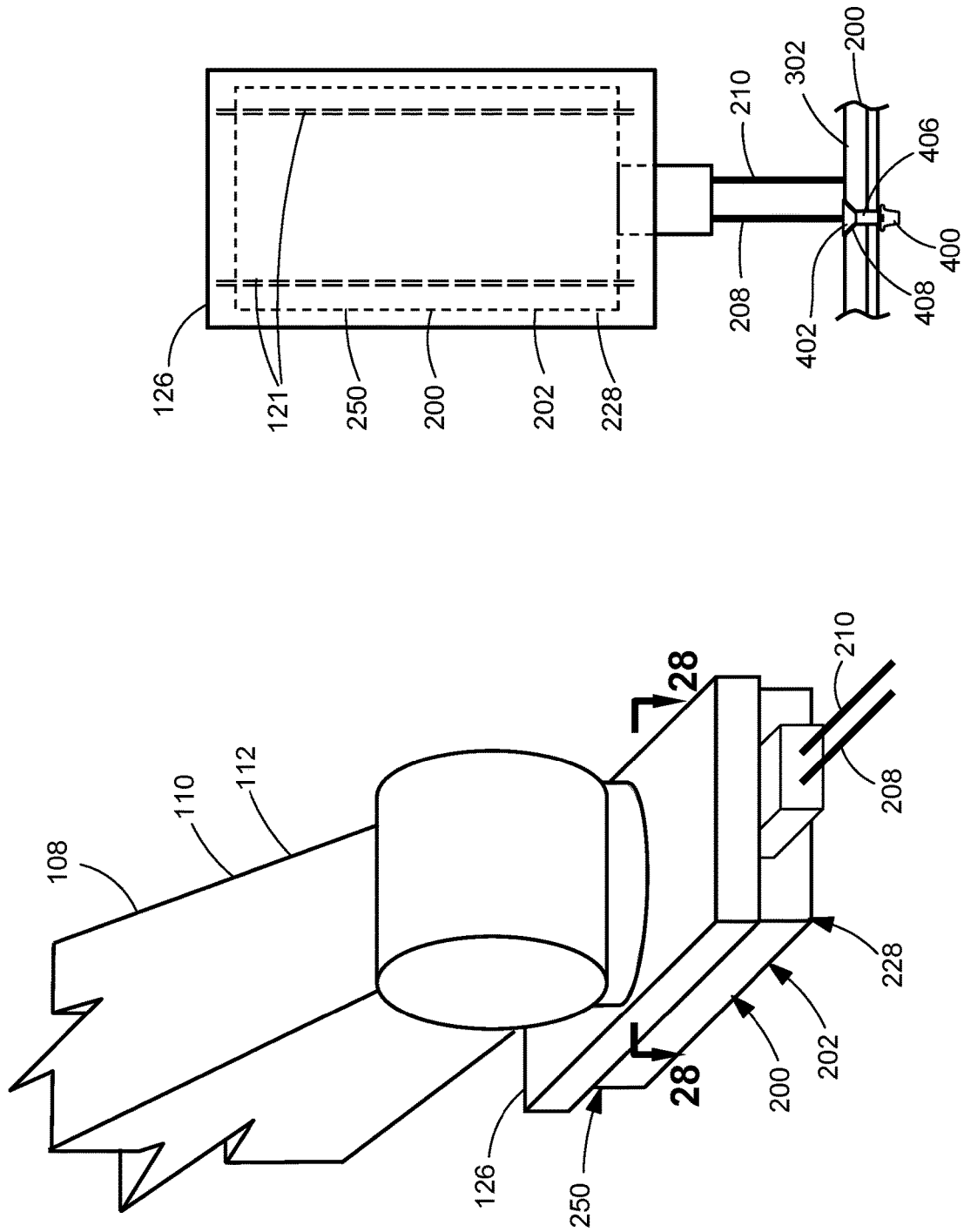

MULTI-FUNCTION END EFFECTOR AND METHOD FOR TESTING THE ELECTRICAL CONTINUITY BETWEEN A STRUCTURE AND A FASTENER

FIELD

The present disclosure relates generally to the testing of electrical continuity between a fastener and a structure into which the fastener has been installed.

BACKGROUND

A commercial aircraft can be struck by lightning multiple times during its service life. Electrical grounding of aircraft components is an important factor in mitigating the potentially harmful effects of lightning strikes. Effective grounding of aircraft components is achieved by providing an uninterrupted path for the flow of electrical energy from the lightning strike through the aircraft before it exits to the ground.

Electrical grounding requirements apply to the multitude of mechanical fasteners typically used in assembling an aircraft. Current methods of verifying the electrical grounding of fasteners include using a resistance meter to measure the electrical resistance between a first point on each fastener head and a second point on an adjacent area of the structure into which the fastener is installed. Since the process is manually performed, there is a risk that the electrical resistance between each fastener and the adjacent structure will be incorrectly measured. For example, current resistance meters require touching the first point and the second point in a specific manner in order to generate an accurate measurement.

The verification process is currently a standalone operation that is typically performed after all fasteners have been installed in a structural assembly. Due to the large quantity of fasteners in certain aircraft types, it is impractical to manually check the electrical ground of each fastener. For example, a fuselage barrel section of a composite transport aircraft can have in excess of 10,000 fasteners.

As can be seen, there exists a need in the art for a system and method for verifying the electrical grounding of multiple fasteners of a structural assembly in a timely manner and which consistently and reliably generates accurate resistance measurements at each fastener.

SUMMARY

The above-noted needs associated with electrical continuity testing are addressed by the present disclosure, which provides an end effector having an end effector frame configured to be mounted to a movable platform capable of positioning the end effector relative to a structure. In addition, the end effector has a plurality of process tools mounted to the end effector frame and having different functional capabilities associated with hole formation and fastener installation in the structure. Furthermore, the end effector has a continuity tester configured to determine the existence of an uninterrupted electrical path between a fastener and the structure after installation of the fastener.

Also disclosed is an end effector having an end effector frame configured to be mounted to a movable platform capable of positioning the end effector relative to a structure. The end effector also has a plurality of process tools mounted to the end effector frame and having different functional capabilities associated with hole formation and fastener installation in the structure. In addition, the end effector has a standalone ohmmeter module mounted to the end effector frame adjacent to the process tools and configured to measure a magnitude of electrical resistance of an electrical path between each fastener and the structure after installation of the fastener.

Also disclosed is a method of testing electrical continuity between a structure and a fastener installed in the structure. The method includes positioning an end effector relative to a structure using a movable platform, and performing, using one or more process tools mounted to the end effector, one or more operations associated with at least one of hole formation and fastener installation in the structure. The method also includes determining, using a continuity tester included with the end effector, the existence of an uninterrupted electrical path between a fastener and the structure after installation of the fastener.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 5 is a magnified view of the end effector of FIG. 2 and illustrating a nose piece of the end effector in contact with a frontside surface of the structural assembly, and further illustrating one of the process tools configured as a touch-off probe as it is moved from a retracted position toward an extended position for engagement with the structural assembly;

FIG. 6 shows the touch-off probe of FIG. 5 in the extended position for measuring one or more characteristic associated with one of the fasteners in the structural assembly;

FIG. 7 is a top view taken along line 7-7 of FIG. 6, and illustrating the touch-off probe measuring the flushness of a fastener head relative to the frontside surface of the structural assembly;

FIG. 8 is a magnified view of the portion of the end effector identified by reference numeral 8 of FIG. 7 and illustrating a continuity tester incorporated into the touch-off probe having a probe element configured as a first test lead of the continuity tester for applying a voltage signal to the fastener head, which passes through the structural assembly and is received in the nose piece, which functions as a second test lead of the continuity tester;

FIG. 9 shows an example of an indicator of the continuity tester having a lighting element and/or a speaker for providing an indication that an electrical path exists between the fastener and the structural assembly;

FIG. 10 shows an example of an indicator for configurations where the continuity tester is an ohmmeter configured to measure the magnitude of electrical resistance of the electrical path between the fastener and the structural assembly;

FIG. 15 shows an example of the end effector having a process tool configured as a fastener installer capable of incorporating a continuity tester, and configured to install a fastener in the hole formed in the structural assembly by the drill bit;

FIG. 16 is a magnified view of the portion of the end effector and the fastener installer identified by reference numeral 16 of FIG. 15 showing the installation of a countersunk fastener in the structural assembly;

FIG. 17 shows the fastener installer disengaging from the structural assembly after installation of the countersunk fastener;

FIG. 19 is a top view of the end effector taken along line 19-19 of FIG. 18 and illustrating the standalone continuity tester module and other process tools in the retracted position and moving along the shuttle axis;

FIG. 20 shows the standalone continuity tester module positioned in alignment with the nose piece during movement of the continuity tester module from the retracted position to the extended position;

FIG. 27 is a top-down perspective view of an example of a standalone continuity tester module attached directly to a robotic arm;

FIG. 28 is a top view of the standalone continuity tester module taken along line 28-28 of FIG. 27;

Figure 1:
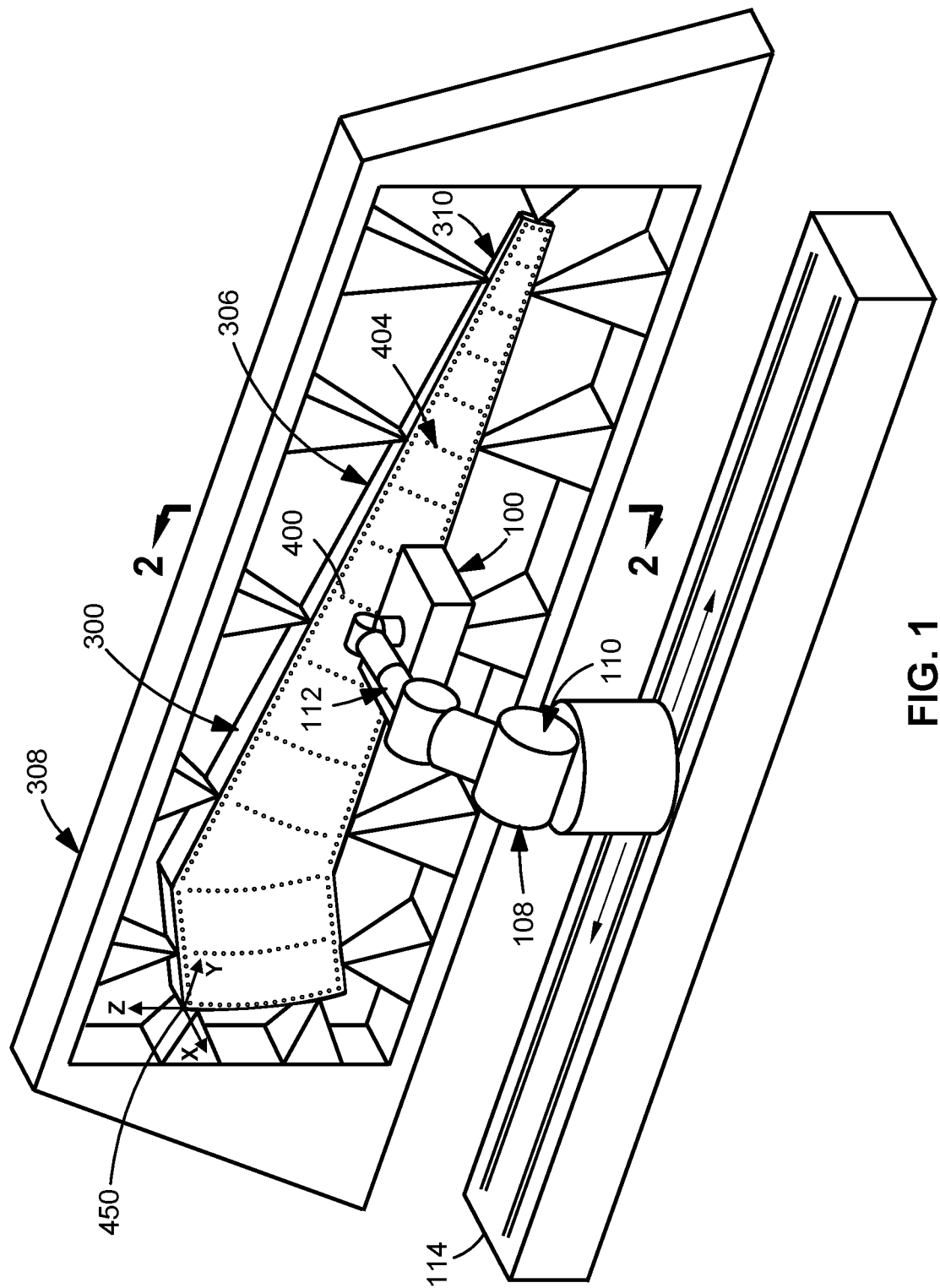
FIG. 1 shows an example of a multi-function end effector supported by a robotic device and configured to install fasteners in a structural assembly.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures 300, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Referring now to the drawings which illustrate various examples of the disclosure, shown in FIGS. 1-6 is an example of a multi-function end effector 100 configured for automated hole formation and fastener installation in a structure 300. As described in greater detail below, the end effector 100 advantageously includes a continuity tester 200 configured to determine if an uninterrupted electrical path 216 exists between each fastener 400 and the structure 300 after installation of the fastener 400 via the end effector 100. Verification of the electrical path 216 is performed as a single event at the completion of each hole formation/fastener installation cycle. The verification process is performed in an automated manner and with repeatable accuracy at each fastener installation. In some examples, the continuity tester 200 is capable of recording the continuity data that is gathered at each fastener installation.

Figure 2:
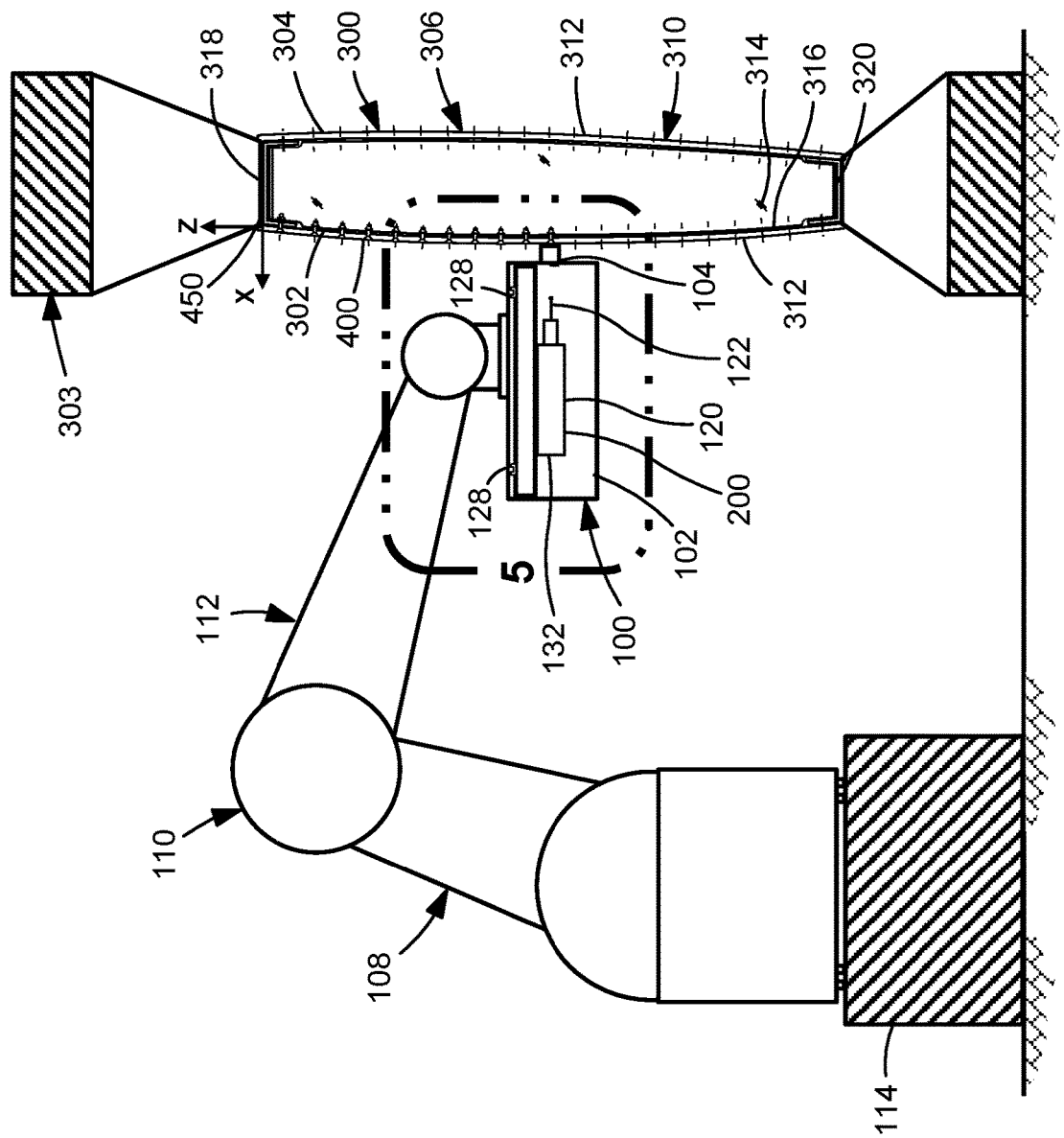
FIG. 2 is a side view taken along line 2-2 of FIG. 1 and illustrating the end effector in contact with the structural assembly during the installation of a fastener.

Referring to FIGS. 1-2, the structure 300 is a structural assembly 306 comprised of two or more components. The components can be formed of metallic material or non-metallic material, such as composite material. For example, one or more of the components of the structure 300 can be formed as a laminate of composite plies. In such examples, the composite plies are comprised of fiber-reinforced polymer matrix material, such as carbon reinforcing fibers in an epoxy matrix material.

In the example of FIGS. 1-2, the structural assembly 306 is a wing box 310 of an aircraft wing. The wing box 310 is rigidly supported by an assembly fixture 308. The wing box 310 includes a front spar 318, a rear spar 320, and a plurality of wing ribs 314 each extending between the front spar 318 and the rear spar 320. The wing box 310 further includes skin panels 312 located on opposite sides of the wing box 310. Each skin panel 312 is fastened to the rib flanges 316 of the wing ribs 314 via a plurality of fasteners 400. The fasteners 400 are installed in an automated manner using the end effector 100. The components of the wing box 310 can be formed of metallic material and/or composite material. For a composite wing box 310, the skin panels 312 can have a protecting coating or layer (not shown) for lighting-strike protection. For example, each composite skin panel 312 can include a conductive layer such as expanded metal foil for dissipating the electrical energy from a lightning strike. Although the presently disclosed end effector 100 is described in the context of installing fasteners 400 in a wing box 310, the end effector 100 can be used for installing fasteners 400 in any one of a variety of different types of structures 300 of any size, shape or configuration, including any type of assembly, subassembly, or system.

Figure 3:
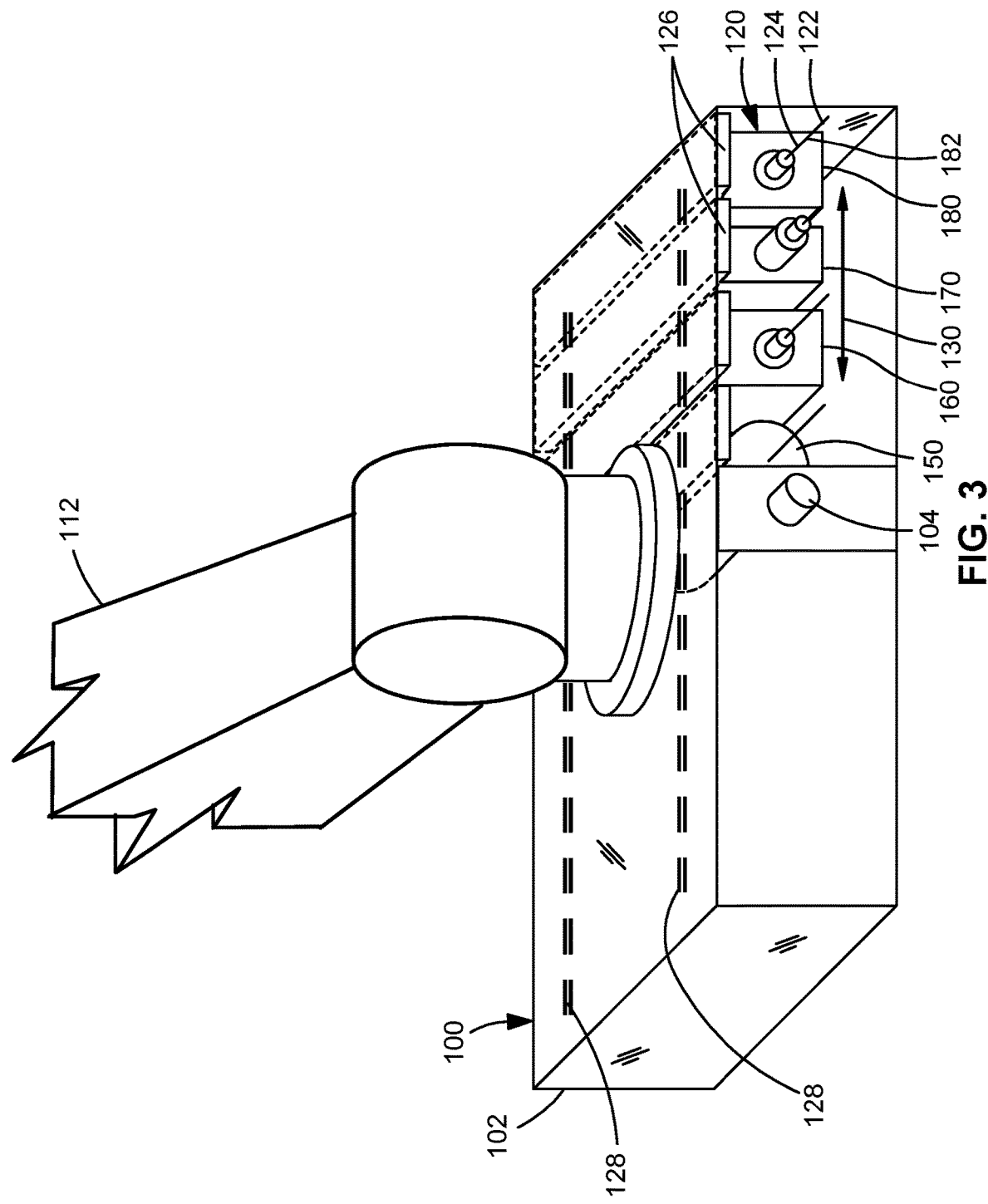
FIG. 3 is a top-down perspective view of an example of an end effector having a plurality of different process tools each having different functional capabilities associated with hole formation and fastener installation in the structural assembly.
Figure 4:
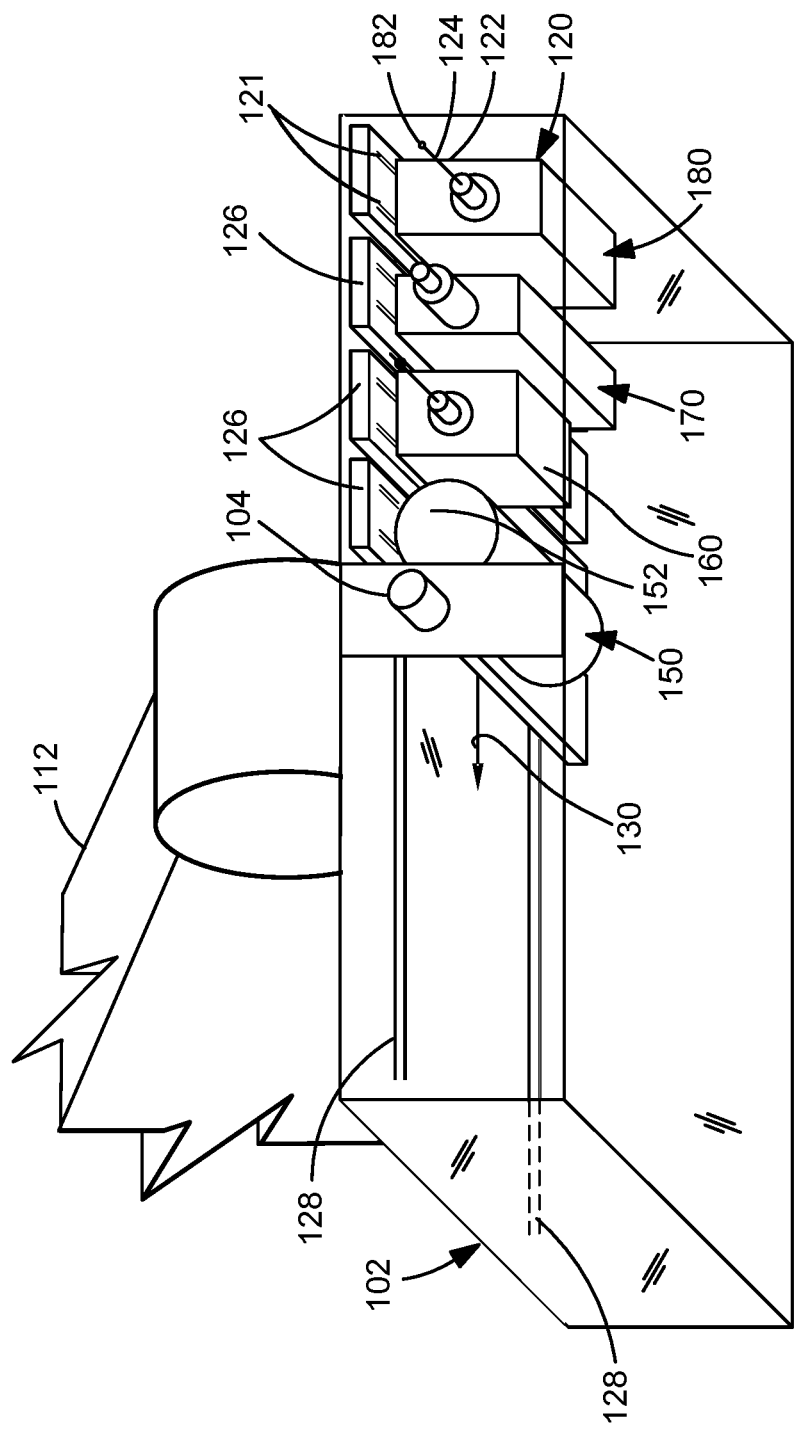
FIG. 4 is a bottom-up perspective view of the end effector of FIG. 3 showing each of the process tools supported by a tool carrier that is movable along a shuttle axis for one-at-a-time engagement of each process tool with the structural assembly.

As shown in FIGS. 3-4, the end effector 100 has an end effector frame 102 configured to be coupled to a movable platform 108. The movable platform 108 is configured to position the end effector 100 relative to the structure 300. In the example shown, the movable platform 108 is a robotic device 110. The end effector frame 102 is coupled to the end of one of the robotic arms 112 of the robotic device 110. The robotic device 110 has a base that is movable along a robotic device track 114 to allow the end effector 100 to be positioned at any position along the length of the structure 300. Although the figures show the movable platform 108 as a robotic device 110, the movable platform 108 can be provided in any one of a variety of alternative configurations. For example, the movable platform 108 can be an overhead gantry (not shown), or any other type of platform capable of positioning the end effector 100 relative to a structure 300.

The end effector frame 102 has a nose piece 104 configured to be placed in contact with a frontside surface 302 of the structure 300 during hole formation and/or fastener installation. In the example shown, the nose piece 104 is annularly shaped and is placed on the frontside surface 302 in a manner such that the nose piece 104 surrounds a desired hole 406 or fastener 400 location. In some examples, the nose piece 104 can apply slight clamping pressure against the structure 300. For the wing box 310 of FIGS. 1-2, the nose piece 104 can apply slight clamping pressure of the skin panel 312 against the rib flange of the wing rib 314. The nose piece 104 can be pivotable for automatically normalizing the nose piece 104 to the local surface of the structure 300.

Referring to FIGS. 3-8, the end effector 100 includes a plurality of process tools 120 mounted to or supported by the end effector frame 102. The plurality of process tools 120 have different functional capabilities associated with hole formation and fastener installation. The process tools 120 are independently operated and are configured to perform their different operations successively or one-at-a-time, as described below.

In the example of FIGS. 3-7, each process tool 120 has a tool carrier 126 coupled to the end effector frame 102. In addition, each process tool 120 has a working end 122 and a tool axis 124. At least some of the process tools 120 are movable along the process tool tracks 121 (FIG. 4) along their respective tool axes 124 between a retracted position 132 (FIG. 5) in which the working end 122 of the process tool 120 is spaced apart from the structure 300, and an extended position 134 (FIG. 6) in which the working end 122 of the process tool 120 is engaged with the structure 300 and/or a fastener 400 during or after installation. In some examples, each tool carrier 126 includes a servomotor (not shown) for moving the process tool 120 along the process tool tracks 121 between the retracted position 132 and the extended position 134.

The process tools 120 are arranged in a manner such that the tool axes 124 of at least some of the process tools 120 are parallel to each other. At least some of the process tools 120 are movable along a shuttle axis 130 perpendicular to the tool axes 124. For example, the end effector frame 102 can have tool carrier tracks 128 (FIGS. 3-4) along which the tool carriers 126 move for one-at-a-time positioning into alignment with the nose piece 104 (e.g., FIG. 7) in preparation for performing an operation associated with hole formation and/or fastener installation.

In the example of FIGS. 3, 4, 7, 11, 13 and 15, the process tools 120 include a spindle 150, a hole probe 160, a fastener installer 170, and a touch-off probe 180. As described below, the spindle 150 is configured to rotatably drive a spindle tool 152 for performing operations associated with hole formation in the structure 300, such as drilling holes 406. Although a single spindle 150 is shown, the end effector 100 can have multiple spindles 150 (e.g., two spindles 150). In this regard, the end effector 100 can have any number of specific types of process tools 120, and is not limited to having a single one of each type of process tool 120. The hole probe 160 is configured to measure at least one characteristic associated with holes 406 formed by the spindle tool 152. The fastener installer 170 is configured to install fasteners 400 in the holes 406 formed by the spindle tool 152. The touch-off probe 180 is configured to measure at least one characteristic associated with a fastener 400 installed in the structure 300 by the fastener installer 170.

As mentioned above, the end effector 100 includes the above-mentioned continuity tester 200 for determining if an electrical path 216 exists between each fastener 400 and the structure 300 after installation of the fastener 400. The continuity tester 200 can be integrated into one of the process tools 120 as shown in the example of FIGS. 7-17. Alternatively, the continuity tester 200 can be a standalone continuity tester module 202 that is mounted to the end effector frame 102 adjacent to the remaining process tools 120, as shown in the example of FIGS. 18-22 and described below.

Regardless of configuration, the continuity tester 200 has a first test lead 208 and a second test lead 210. The first test lead 208 is configured to be placed in direct contact with the fastener head 402 (e.g., at the center of the fastener head 402) of the fastener 400 installed in the structure 300. The second test lead 210 is preferably placed in direct contact with the frontside surface 302 of the structure 300 at a relatively short distance from the circumferential edge of the fastener head 402. For example, the second test lead 210 can be placed on the frontside surface 302 at a distance of approximately 0.25 inch from the fastener head 402 or the circumferential edge of a washer 422 (FIG. 22) under the fastener head 402.

Figure 21:
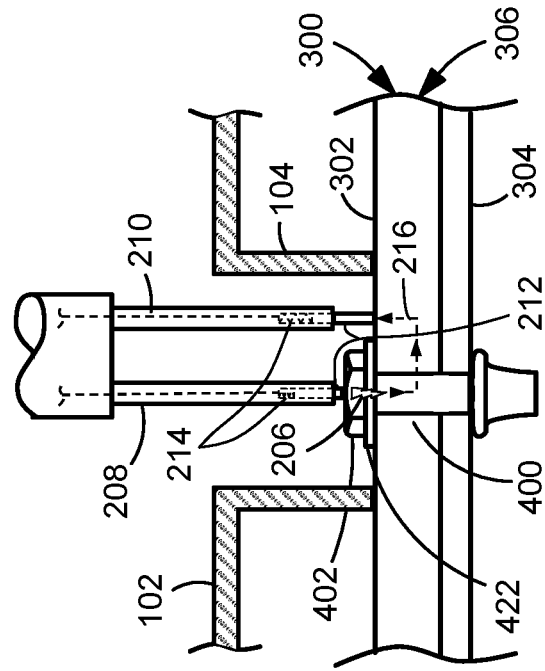
FIG. 21 is a magnified view of the portion of the end effector identified by reference numeral 21 of FIG. 20, and illustrating the first test lead and the second test lead of the continuity tester respectively in contact with the fastener head of a countersunk fastener and the frontside surface of the structural assembly for verifying and/or measuring the electrical path between the fastener and the structural assembly.
Figure 22:
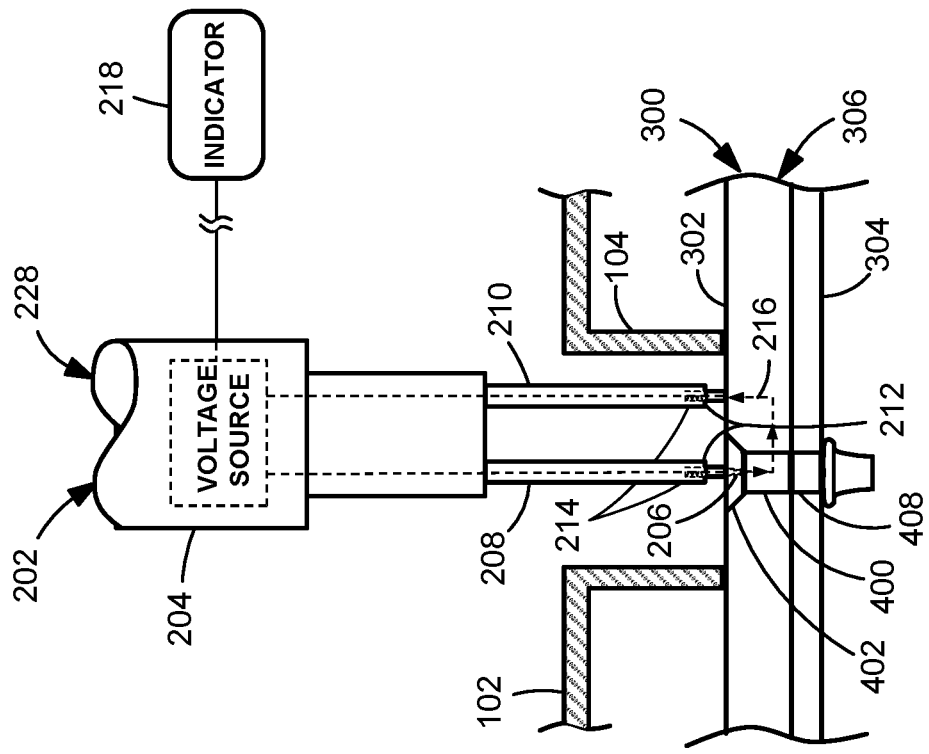
FIG. 22 shows an example of the first and second test leads having spring-loaded test lead tips accommodating a protruding head fastener installed by the end effector into the structural assembly.

The continuity tester 200 is configured to apply a voltage signal 206 to the fastener head 402 of a fastener 400 via the first test lead 208, and receive electrical current at the second test lead 210 that is placed in contact with the structure 300 as shown in FIGS. 8, 21, and 22. For example, the continuity tester 200 includes a voltage source 204 such as a battery (not shown) for applying the voltage signal 206 to the fastener head 402. The voltage signal 206 is applied to the fastener head 402 immediately after installation of each fastener 400 for verifying the existence of an electrical path 216 between the fastener 400 and the structure 300. For the example where the continuity tester 200 is integrated into one of the process tools 120, the working end 122 of the process tool 120 is electrically connected to the continuity tester 200 and is configured to function as the first test lead 208, and the nose piece 104 is electrically connected to the continuity tester 200 and is configured to function as the second test lead 210.

Referring to FIGS. 7-10, shown is an example of the continuity tester 200 integrated into the touch-off probe 180 which, as mentioned above, is configured to inspect a fastener 400 after installation. For example, the touch-off probe 180 includes a probe element 182 for measuring the flushness of the fastener head 402 of a countersunk fastener 408 (FIG. 8) relative to the frontside surface 302 of the structure 300. Alternatively, the touch-off probe 180 can measure the protrusion of the fastener head 402 of a protruding head fastener 410 (FIG. 22) relative to the frontside surface 302.

Referring to FIG. 8, after inspection of the fastener installation via the touch-off probe 180, the voltage source 204 is activated, causing a voltage signal 206 to be applied to the fastener head 402 via the probe element 182 while in contact with the fastener head 402. In this regard, the probe element 182 functions as the first test lead 208 of the continuity tester 200, as mentioned above. The nose piece 104 functions as the second test lead 210 of the continuity tester 200, and is in contact with the frontside surface 302 of the structure 300, such that if an uninterrupted electrical path 216 exists between the fastener 400 and the structure 300, the voltage signal 206 passes into the nose piece 104 and flows back to the continuity tester 200.

Referring to FIGS. 8-9, the continuity tester 200 has an indicator 218 configured to provide an indication of either the existence or the absence of an electrical path 216 between the fastener 400 and the structure 300. For example, FIG. 9 shows an example of an indicator 218 having a lighting element 220 (e.g., an LED) that illuminates upon receiving electrical current as a result of the voltage signal 206, thereby indicating that an electrical path 216 exists between the fastener 400 and the structure 300. The failure of the lighting element 220 to illuminate would indicate the absence of an electrical path 216 between the fastener 400 and the structure 300. Alternatively or additionally, the indicator 218 can have a speaker 222 configured to generate an audible sound (e.g., a buzz, a beep, etc.) upon receiving electrical current as a result of the voltage signal 206, thereby indicating that an electrical path 216 exists between the fastener 400 and the structure 300. The failure of the speaker 222 to generate an audible sound would indicate the absence of an electrical path 216 between the fastener 400 and the structure 300. As may be appreciated, the indicator 218 can be provided in any one of a variety of alternative configurations for indicating the existence or absence of an electrical path 216 between the fastener 400 and the structure 300.

In some examples, the continuity tester 200 can record "Pass" or "Fail" for each fastener 400, with "Pass" indicating the existence of an electrical path 216 between the fastener 400 and the structure 300, and "Fail" indicating the lack of an electrical path 216 between the fastener 400 and the structure 300. Prior to use, the continuity tester 200 can be programmed to determine the electrical resistance value that constitutes "Pass" and the electrical resistance value that constitutes "Fail." The values (e.g., allowable ranges) of electrical resistance are dependent upon various factors, such as the material composition in the structure and the fastener 400 and/or engineering requirements. In this regard, the electrical resistance values for "Pass" and "Fail" would be set or adjusted for the continuity tester 200, and would not be a factory setting. Furthermore, the measuring component (e.g., a sample fastener installation) would be calibrated and/or certified to ensure that the electrical resistance values measured by the continuity tester 200 are accurate. Along with its "Pass" or "Fail" recording, the location of each fastener 400 can be identified by x, y, z coordinates relative to a reference coordinate system 450 (FIG. 1) with origin at a known location on the structure 300, such as one of the corners of a skin panel 312 in the example of the wing box 310 of FIG. 1. The continuity tester 200 can transmit the "Pass" or "Fail recording of each fastener 400 along with its three-dimensional coordinates to a processor (not shown) for later analysis.

Referring to FIGS. 8 and 10, in some examples, the continuity tester 200 can be integrated into one of the process tool 120 as an ohmmeter 230 configured to measure the magnitude of electrical resistance (e.g., in ohms) of the electrical path 216 between each fastener 400 and the structure 300. For certain applications where the electrical resistance between a fastener 400 and the structure 300 is relatively small, the ohmmeter 230 can be a milliohm meter. For example, for the composite wing box 310 (FIG. 1) in which the fasteners 400 are installed in a composite skin panel 312, the ohmmeter 230 can be a milliohm meter for recording electrical resistance on the order of 0.001 ohm.

For the example of FIG. 8 in which the process tool 120 is a touch-off probe 180, the ohmmeter 230 includes a voltage source 204 configured to apply a voltage signal 206 to the fastener head 402 via the probe element 182. The ohmmeter 230 measures the magnitude of electrical resistance of the electrical path 216 between each fastener 400 and the structure 300. As shown in FIG. 10, the ohmmeter 230 includes an indicator 218 for displaying the magnitude of the electrical resistance on a display screen 224 (e.g., at an operator station), such as in real time. The ohmmeter 230 can transmit the electrical resistance measurement to a processor (not shown) where it is recorded, along with the three-dimensional coordinates of the fastener 400, similar to the "Pass" or "Fail recording described above for the continuity tester 200.

Figure 12:
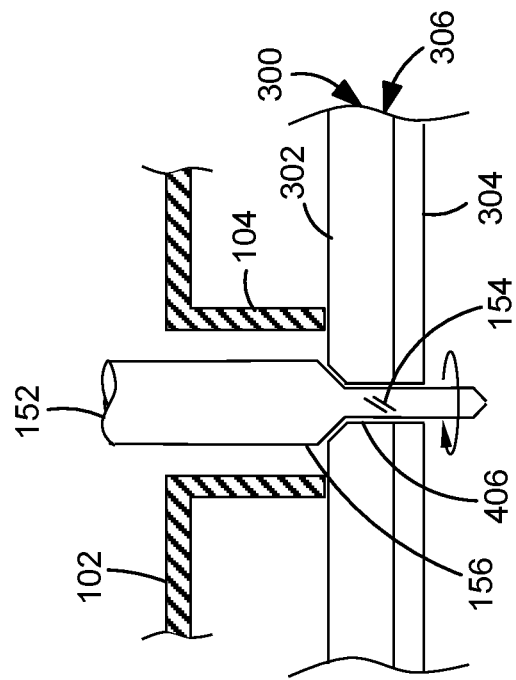
FIG. 12 is a magnified view of the portion of the end effector and process tool identified by reference numeral 12 of FIG. 11, and illustrating the drill bit during the formation of the countersunk hole in the structural assembly.
Figure 11:
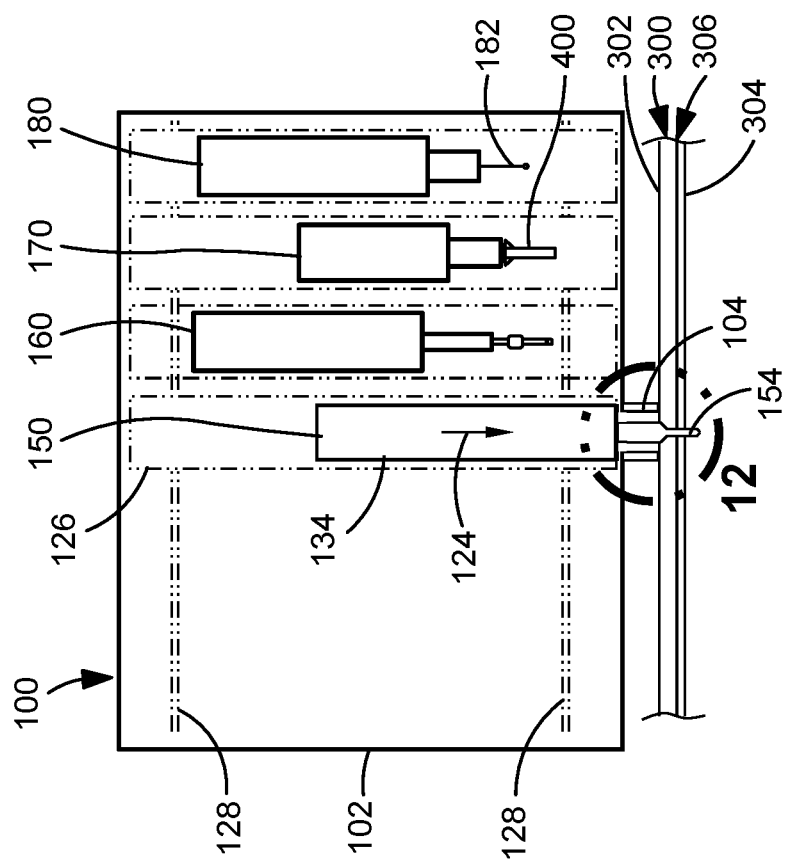
FIG. 11 is a top view of an example of the end effector having a process tool configured as a spindle capable of incorporating a continuity tester, and configured to rotatably drive a spindle tool such as a drill bit having a countersunk tool for forming a countersunk hole in the structural assembly.

Although the continuity tester 200 and ohmmeter 230 are described in the context of a touch-off probe 180, the continuity tester 200 and ohmmeter 230 can also be integrated into any one or more of the other process tools 120 of the end effector 100. For example, the continuity tester 200 and ohmmeter 230 can be integrated into the spindle 150, as shown in FIGS. 11-12. As mentioned above, the spindle 150 is configured to rotatably drive a spindle tool 152 for performing operations associated with hole formation in the structure 300. For example, the spindle tool 152 can be a drill bit 154 for drilling a new hole 406 in the structure 300, a countersink tool 156 for countersinking an existing hole 406 as shown in FIG. 12, a milling bit (not shown) for machining the frontside surface 302 at the location of a fastener 400 hole 406, or any one of a variety of other types of spindle tools 152. The spindle tool 152 can function as the first test lead 208 for applying a voltage signal 206 to an existing fastener installation at another location on the structure 300, and the nose piece 104 can function as the second test lead 210 for receive the voltage signal 206 if an electrical path 216 exists between the fastener 400 and the structure 300.

Figure 14:
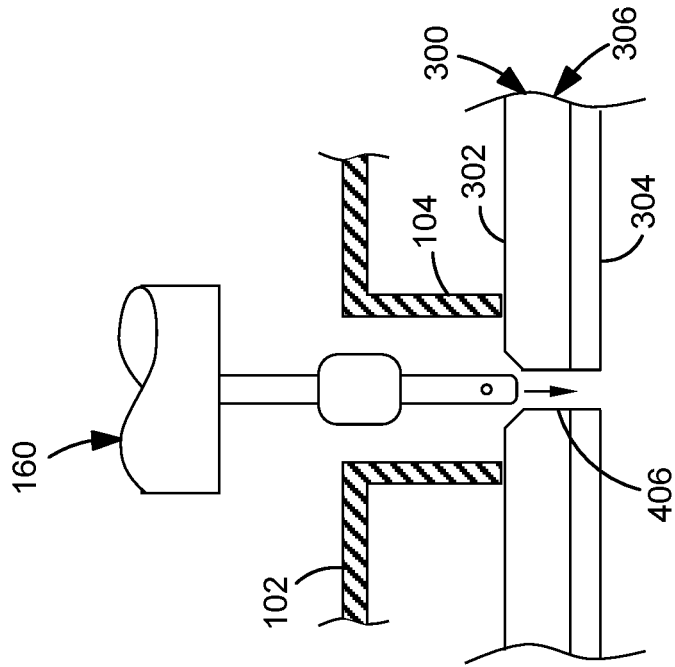
FIG. 14 is a magnified view of the portion of the end effector and the hole probe identified by reference numeral 14 of FIG. 13.
Figure 13:
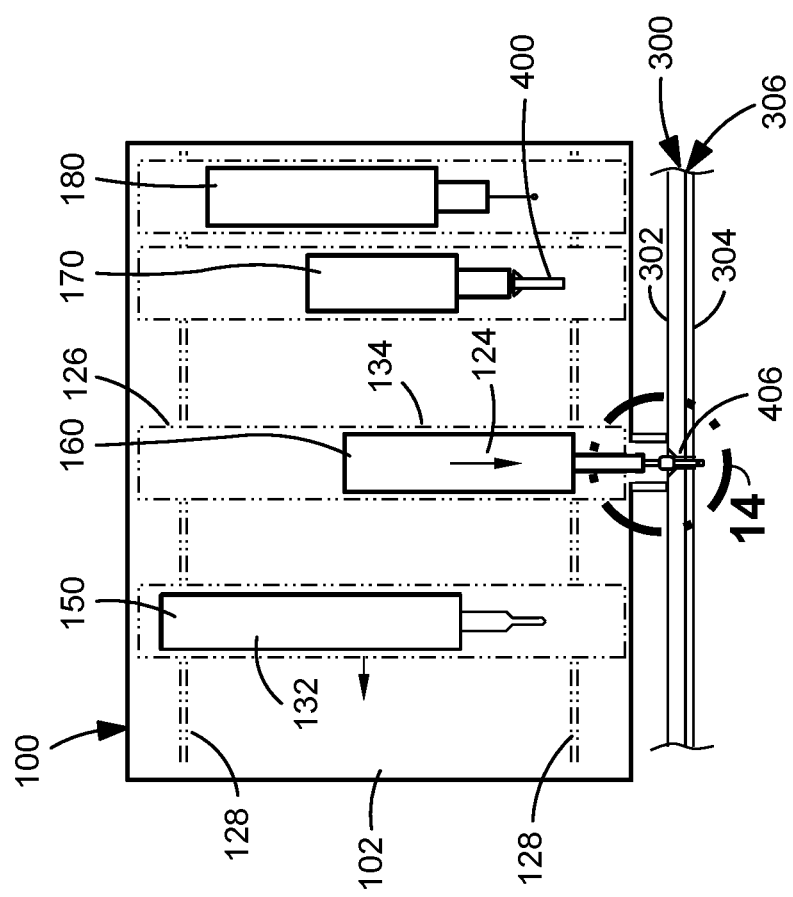
FIG. 13 shows an example of the end effector having a process tool configured as a hole probe capable of incorporating a continuity tester, and configured to measure at least one characteristic associated with the hole formed in the structural assembly by the drill bit.

In another example, the continuity tester 200 and ohmmeter 230 can be integrated into the hole probe 160, as shown in FIGS. 13-14. As mentioned above, the hole probe 160 is configured to perform hole inspections, such as measuring the hole diameter, the countersink depth, the material stack thickness of the structure 300 at an existing hole location, or other hole characteristics. The hole probe 160 can function as the first test lead 208 for applying a voltage signal 206 to an existing fastener installation, and the nose piece 104 can function as the second test lead 210 for receive the voltage signal 206 if an electrical path 216 exists between the fastener 400 and the structure 300.

In a still further example, the continuity tester 200 and ohmmeter 230 can be integrated into the fastener installer 170, as shown in FIGS. 15-17. As mentioned above, the fastener installer 170 has a rotary drive member 172 configured to install fasteners 400 in holes 406 in the structure 300. The fasteners 400 can be bolts, screws, sleeved bolts or other fastener types. In the example shown the fastener 400 is a blind fastener 412 having a disposable drive nut 418 and a threaded screw 414 which extends into a nut sleeve 416 having a blind sleeve 420, the end of which circumferentially expands against the backside surface 304 of the structure 300 during rotation of the threaded screw 414 relative to the drive nut 418. The threaded screw 414 is configured to fracture, and the drive nut 418 is configured to break off from the nut sleeve 416 when the torque level on the threaded screw 414 reaches a predetermined magnitude. The drive member 172 can function as the first test lead 208 for applying a voltage signal 206 to an existing fastener installation at another location on the structure 300, and the nose piece 104 can function as the second test lead 210 for receive the voltage signal 206 if an electrical path 216 exists between the fastener 400 and the structure 300.

It should be noted that the above-described process tools 120 are several examples of a wide range of other types of process tools (not shown) into which a continuity tester 200 or ohmmeter 230 can be integrated as part of their functionality.

Figure 18:
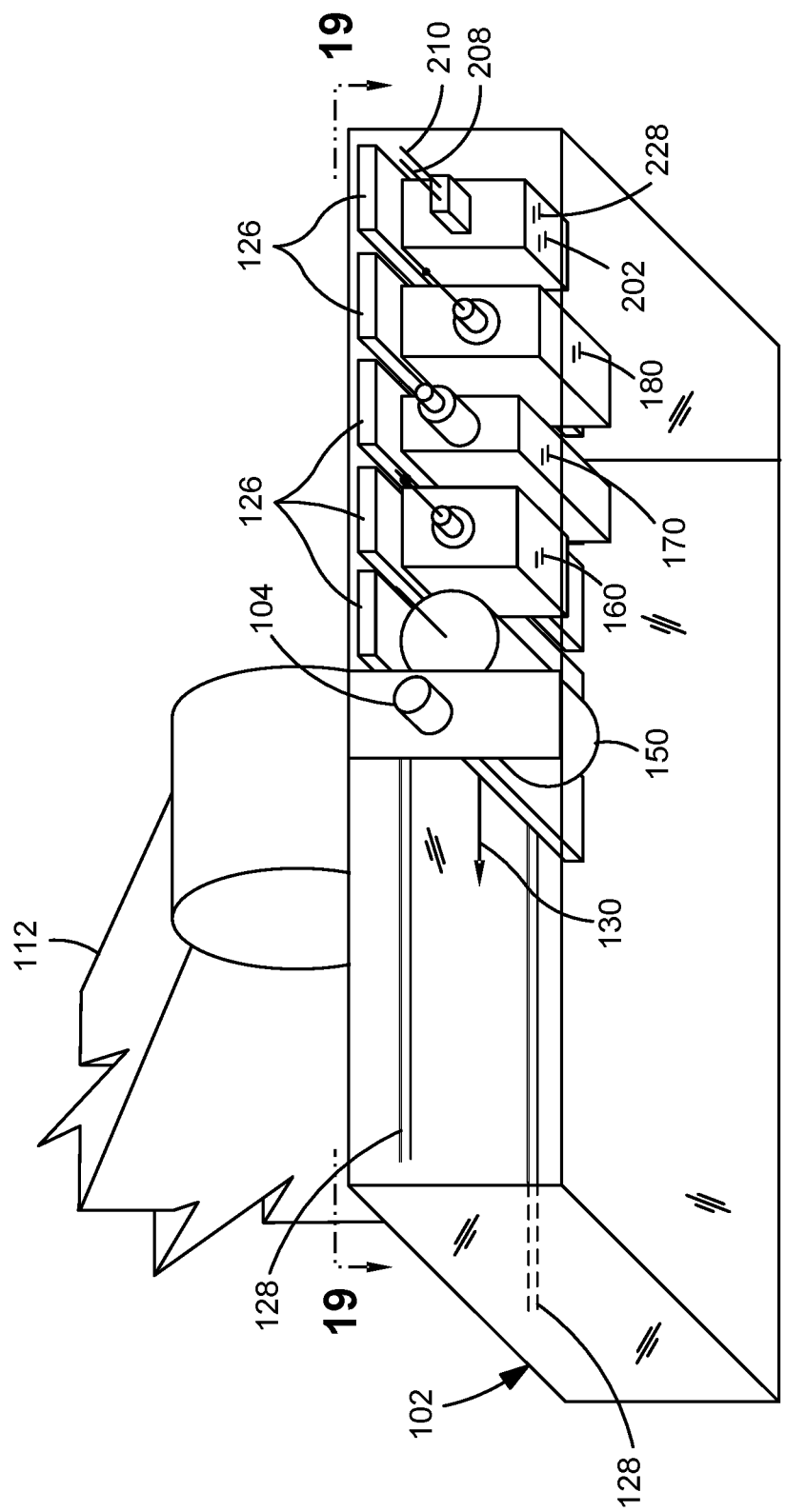
FIG. 18 is a bottom-up perspective view of an example of an end effector having a standalone continuity tester module mounted in the end effector adjacent to the other process tools.

Referring to FIGS. 18-22, shown is an example of an end effector 100 in which the continuity tester 200 is a stand-alone continuity tester module 202 configured to determine the existence or absence of an uninterrupted electrical path 216 between a fastener 400 and the structure 300 after installation of the fastener 400. The continuity tester module 202 is independently supported by a tool carrier 126 which is coupled to the end effector frame 102. The continuity tester module 202 is located adjacent to the remaining process tools 120, and has a tool axis 124 oriented parallel to the tool axes 124 of the remaining process tools 120. The remaining process tools 120 in FIGS. 18-20 are the same process tools 120 described above, but without the integrated continuity tester 200.

The continuity tester module 202 has a first test lead 208 and a second test lead 210 which, in the example shown, are parallel to each other. The first test lead 208 and the second test lead 210 are configured to be placed in contact respectively with the fastener head 402 of a fastener 400 and a frontside surface 302 of the structure 300. The second test lead 210 is configured to contact the frontside surface 302 at a location immediately adjacent to the fastener 400, such as at a distance of approximately 0.25 inch from the circumferential edge of the fastener head 402 or the circumferential edge of a washer 422 (FIG. 22) installed under the fastener head 402.

As shown in FIGS. 19-20, the continuity tester module 202 is movable along the shuttle axis 130 via the tool carrier tracks 128 for positioning the continuity tester module 202 into alignment (FIG. 20) with the nose piece 104 in preparation for checking for an uninterrupted electrical path 216 between a fastener 400 and the structure 300. The continuity tester module 202 is also movable (e.g., via a servomotor) along its tool axis 124 between a retracted position 132 (FIG. 19), and an extended position 134 (FIG. 20) in which the first test lead 208 is placed in contact with the fastener head 402 of a fastener 400 and the second test lead 210 is placed in contact with the frontside surface 302 of the structure 300.

FIG. 21 shows the first test lead 208 and the second test lead 210 respectively in contact with the fastener head 402 of a countersunk fastener 408 and the frontside surface 302 of the structure 300. The first test lead 208 and the second test lead 210 optionally include test lead tips 212 that are spring loaded via a compression spring 214. The spring-loaded test lead tips 212 accommodate height differences between the fastener 400 and the structure 300. For example, FIG. 22 shows the spring-loaded test lead tips 212 accommodating a protruding head fastener 410 installed by the end effector 100.

Similar to the arrangement of the integrated continuity tester 200 described above with regard to FIGS. 8-10, the continuity tester module 202 of FIGS. 18-22 includes a voltage source 204 for applying a voltage signal 206 to the fastener head 402 via the first test lead 208. The second test lead 210 is configured to receive the voltage signal 206 if an electrical path 216 exists between the fastener 400 and the structure 300. The continuity tester module 202 has an indicator 218 configured to provide an indication of either the existence or the absence of an electrical path 216 between the fastener 400 and the structure 300. As shown in FIG. 9 and described above, the indicator 218 can include a lighting element 220 that illuminates upon receiving electrical current as a result of the voltage signal 206, thereby indicating that an electrical path 216 exists between the fastener 400 and the structure 300. Alternatively or additionally, the indicator 218 can have a speaker 222 that generates an audible sound upon receiving electrical current as a result of the voltage signal 206, thereby indicating that an electrical path 216 exists between the fastener 400 and the structure 300. As mentioned above, the indicator 218 can be provided in any one of a variety of alternative configurations for indicating the existence or absence of an electrical path 216 between the fastener 400 and the structure 300.

Similar to the arrangement described above for the integrated continuity tester 200, the continuity tester module 202 can record "Pass" or "Fail" for each fastener 400, with "Pass" indicating the existence of an electrical path 216 between the fastener 400 and the structure 300, and "Fail" indicating the lack of an electrical path 216 between the fastener 400 and the structure 300. The location of each fastener 400 can be identified by x, y, z coordinates relative to a reference coordinate system 450 (FIG. 1). The continuity tester module 202 can transmit the "Pass" or "Fail" recording of each fastener 400 along with its three-dimensional coordinates to a processor (not shown) for later review.

In some examples, the continuity tester module 202 can be provided as a standalone ohmmeter module 228 (e.g., a milliohm meter module) configured to measure the magnitude of electrical resistance of the electrical path 216 between each fastener 400 and the structure 300. Similar to the above-described operation of the continuity tester module 202, the ohmmeter module 228 includes a voltage source 204 for applying a voltage signal 206 to the fastener head 402 via the first test lead 208, and the second test lead 210 receives the voltage signal 206 if an electrical path 216 exists between the fastener 400 and the structure 300. The ohmmeter module 228 measures the magnitude of electrical resistance of the electrical path 216 between each fastener 400 and the structure 300. The ohmmeter module 228 includes an indicator 218 (FIG. 21) for displaying the magnitude of the electrical resistance on a display screen 224. The ohmmeter module 228 can transmit the electrical resistance measurement to a processor (not shown) where it is recorded, along with the three-dimensional coordinates of the fastener 400, similar to the arrangement described above for the integrated continuity tester 200.

Figure 23:
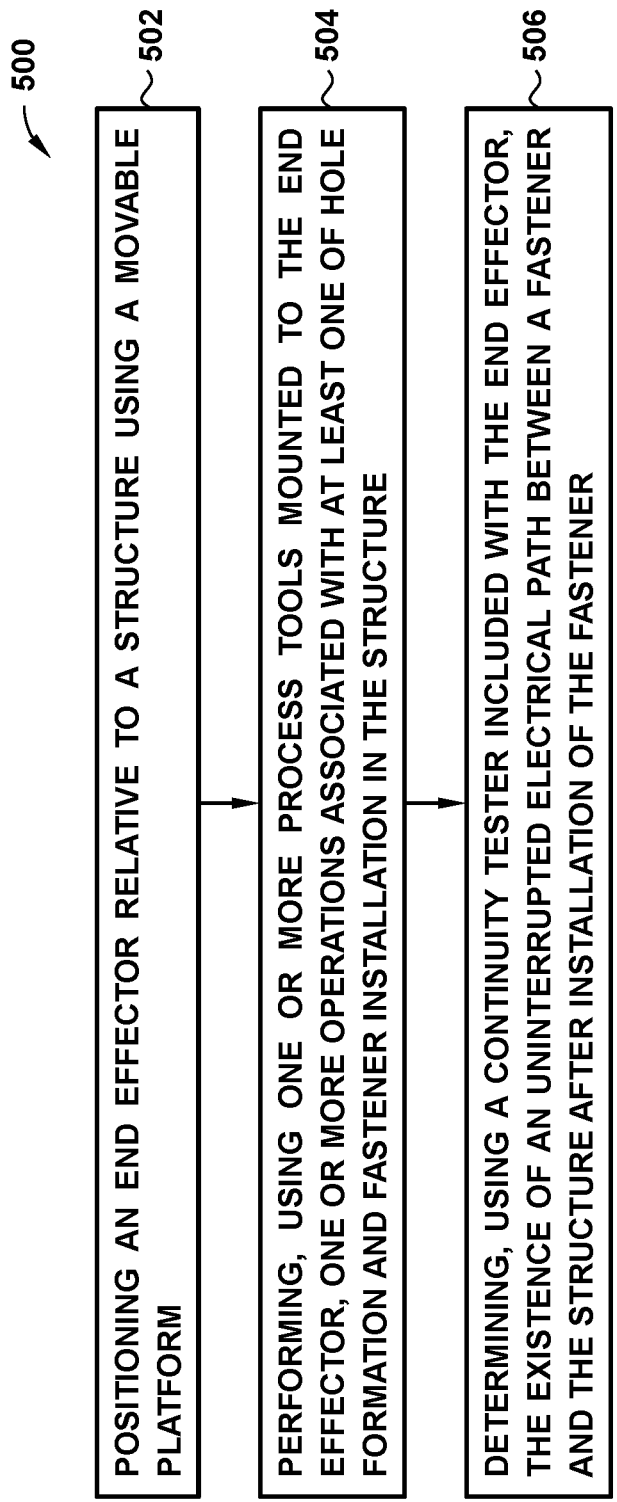
FIG. 23 is a flowchart of operations included in a method of testing electrical continuity between a structure and a fastener installed in the structure using a continuity tester of a multi-function end effector.

Referring now to FIG. 23, shown is a flowchart of operations included in a method 500 of testing electrical continuity between a structure 300 and a fastener 400 installed in the structure 300 using an end effector 100. Step 502 of the method 500 comprises positioning the end effector 100 relative to a structure 300 using a movable platform 108. In the example of FIGS. 1-2, step 502 comprises positioning the end effector 100 relative to the structure 300 using a robotic device 110. As described above, the end effector frame 102 is coupled to the end of one of the robotic arms 112 of the robotic device 110, and the base of the robotic device 110 is movable along a robotic device track 114 to allow the end effector 100 to be positioned at any position along the length of the structure 300. In other examples not shown, step 502 comprises positioning the end effector 100 using an overhead gantry (not shown), or any other type of platform capable of positioning the end effector 100 relative to a structure 300.

Step 504 of the method 500 comprises performing, using one or more process tools 120 mounted to the end effector 100, one or more operations associated with hole formation and/or fastener installation in the structure 300. For the example of FIGS. 3-17, step 504 comprises using a spindle 150 to rotatably drive a spindle tool 152 for performing operations associated with hole formation in the structure 300. Hole forming operations include drilling new holes 406 in the structure 300 using a drill bit 154, countersinking an existing hole 406 using a countersink tool 156, reaming an existing hole 406 using a reaming bit (not shown), machining the frontside surface 302 at the location of a fastener hole 406 using a milling bit (not shown), or any one of a variety of other types of operations associated with hole formation.

Step 504 of the method 500 can also include using a hole probe 160 to measure at least one characteristic associated with holes 406 formed in the structure 300 by the spindle tool 152 as shown in FIGS. 13-14 and described above. For example, step 504 can include using the hole probe 160 to measure the hole diameter, measure the depth of a countersink, or measure the material stack thickness of the structure 300 at an existing hole location.

Step 504 of the method 500 also includes using a fastener installer 170 to install fasteners 400 in the holes 406 in the structure 300 as shown in FIGS. 15-17 and described above. For example, step 504 can include rotating a drive member 172 of the fastener installer 170 to install sleeved bolts in holes 406 formed in the structure 300 using the spindle 150. In the examples of FIGS. 15-17, step 504 includes using the fastener installer 170 to insert a blind fastener 412 in a hole 406, and rotating a disposable drive nut 418 to cause a blind sleeve 420 of the blind fastener 412 circumferentially expands against the backside surface 304 of the structure 300. Upon reaching a predetermined torque level, the drive nut 418 breaks off from the nut sleeve 416, completing the installation of the blind fastener 412.

Step 504 of the method 500 can also include using a touch-off probe 180 to measure at least one characteristic associated with a fastener 400 installed in the structure 300 as shown in FIGS. 7-8 and described above. For example, step 504 can include using a probe element 182 of the touch-off probe 180 to measure the flushness of the fastener head 402 of a countersunk fastener 408 (FIG. 8) relative to the frontside surface 302 of the structure 300. Alternatively, step 504 can include using a probe element 182 of the touch-off probe 180 to measure the protrusion of a fastener head 402 of a protruding head fastener 410 (FIG. 22) relative to the frontside surface 302.

Step 506 of the method 500 comprises determining, using a continuity tester 200 included with the end effector 100, the existence of an uninterrupted electrical path 216 between a fastener 400 and the structure 300 after installation of the fastener 400. In this regard, step 506 comprises placing a first test lead 208 in contact with the fastener head 402 of a fastener 400, placing a second test lead 210 in contact with a frontside surface 302 of the structure 300 at a location adjacent to the fastener 400, and applying, using the continuity tester 200, a voltage signal 206 into the fastener 400 via the first test lead 208.

For examples in which the continuity tester 200 is integrated into one of the process tools 120, the step 506 of placing the first test lead 208 in contact with the fastener head 402 comprises placing the working end 122 of one of the process tools 120 in contact with the fastener head 402. As described above, the working end 122 of each process tool 120 is configured to engage with the structure 300 and/or the fastener 400 to perform one or more operations associated with hole formation and/or fastener installation. In the example of the integrated continuity tester 200, the working end 122 is electrically connected to the continuity tester 200. Examples of placing the working end 122 of a process tool 120 in contact with the fastener head 402 include placing the spindle tool 152 of a spindle 150 in contact with the fastener head 402 of a fastener 400 installed at another location on the structure 300. Another example of placing the working end 122 of a process tool 120 in contact with the fastener head 402 includes placing a hole probe 160 in contact with the fastener head 402 of a fastener 400 installed at another location on the structure 300. An additional example includes placing the drive member 172 of the fastener installer 170 in contact with the fastener head 402 of a fastener 400 just installed by the fastener installer 170.

Referring to FIGS. 8-10, another example of placing the working end 122 of a process tool 120 in contact with the fastener head 402 includes placing the touch-off probe 180 in contact with the fastener head 402 of a fastener 400 prior to or after inspecting the fastener installation. For example, the method includes placing the placing the probe element 182 of the touch-off probe 180 in contact with the fastener head 402 before or after measuring the flushness of the fastener head 402 of a countersunk fastener 408 relative to the frontside surface 302. As mentioned above, the step of placing the second test lead 210 in contact with the frontside surface 302 comprises placing a nose piece 104 of the end effector 100 in contact with the frontside surface 302. As described above and shown in FIG. 8, the nose piece 104 is electrically connected to the continuity tester 200.

After placing the probe element 182 in contact with the fastener head 402, the method includes activating the voltage source 204 to apply a voltage signal 206 to the fastener head 402 via the probe element 182. As mentioned above, the nose piece 104 is in contact with the frontside surface 302 of the structure 300, such that if an uninterrupted electrical path 216 exists between the fastener 400 and the structure 300, the voltage signal 206 passes into the nose piece 104 and flows back to the continuity tester 200. The method includes providing an indication of either the existence or the absence of an electrical path 216 between the fastener 400 and the structure 300. For example, the continuity tester 200 can include an indicator 218 having a lighting element 220 (e.g., an LED) that illuminates or a speaker 222 that makes an audible sound to indicate that an electrical path 216 exists between the fastener 400 and the structure 300. The failure of the lighting element 220 to illuminate or the speaker 222 to emit a sound would indicate the absence of an electrical path 216 between the fastener 400 and the structure 300.

In some examples, the method can include recording "Pass" or "Fail" for each fastener 400 to indicate the existence or absence of an electrical path 216 between the fastener 400 and the structure 300, along with the three-dimensional coordinates of each fastener 400. The "Pass" or "Fail" information of each fastener 400 along with its three-dimensional coordinates can be transmitted to a processor (not shown) for later review.

In some examples, step 506 of using a continuity tester 200 to determine the existence of an uninterrupted electrical path 216 between the fastener 400 and the structure 300 comprises measuring, using an ohmmeter 230, the magnitude of electrical resistance of the electrical path 216. In such examples, the method can include displaying the magnitude of the electrical resistance on a display screen 224 as shown in FIG. 10. The method can also include transmitting the electrical resistance measurement to a processor (not shown) where it is recorded, along with the three-dimensional coordinates of the fastener 400.

Referring to FIGS. 18-22, in some examples, step 506 of determining the existence of an uninterrupted electrical path 216 between the fastener 400 and the structure 300 is performed using a standalone continuity tester module 202. As described above, the continuity tester module 202 is independently supported by a tool carrier 126 which is coupled to the end effector frame 102, and is located adjacent to the remaining process tools 120. After hole formation and fastener installation is complete, the method includes moving the continuity tester module 202 along the shuttle axis 130 via the tool carrier tracks 128 until the continuity tester module 202 is aligned (FIG. 20) with the nose piece 104. The method then includes moving the continuity tester module 202 along its tool axis 124 from the retracted position 132 (FIG. 19) to the extended position 134 (FIG. 20) until the first test lead 208 is in contact with the fastener head 402 of a fastener 400 and the second test lead 210 is in contact with the frontside surface 302 of the structure 300.

Similar to the operation of the integrated continuity tester 200, the operation of the continuity tester module 202 includes activating the voltage source 204 to apply a voltage signal 206 to the fastener head 402 via the first test lead 208. The second test lead 210 is configured to receive the voltage signal 206 if an electrical path 216 exists between the fastener 400 and the structure 300. The method can include indicating either the existence or absence of an electrical path 216 between the fastener 400 and the structure 300 using an indicator 218. As described above, the indicator 218 can illuminate a light source or cause a speaker 222 to generate an audible sound if an electrical path 216 exists between the fastener 400 and the structure 300. The indicator 218 can include other configurations for indicating the existence or absence of an electrical path 216 between the fastener 400 and the structure 300. A "Pass" or "Fail" can be recorded for each fastener 400 along with its three-dimensional coordinates.

As mentioned above, the continuity tester module 202 can be provided as a standalone ohmmeter module 228. In such examples, the method includes activating the voltage source 204 to apply a voltage signal 206 to the fastener head 402 via the first test lead 208, and receiving the voltage signal 206 at the second test lead 210 if an electrical path 216 exists between the fastener 400 and the structure 300. The method includes measuring the magnitude of the electrical resistance of the electrical path 216 between each fastener 400 and the structure 300, and providing an indication of the magnitude. For example, the method can include displaying the magnitude of the electrical resistance on a display screen 224. Alternatively or additionally, the method can include transmitting the electrical resistance measurement to a processor (not shown) where it is recorded, along with the three-dimensional coordinates of the fastener 400, similar to the arrangement described above for the integrated continuity tester 200.

Referring now to FIGS. 24-35, shown are examples of a continuity testing system 250 for testing the ground path of fasteners 400 installed in a structure 300. Although described extensively above in terms of a multi-function end effector 100 (e.g., FIGS. 1-22), the continuity tester 200 of FIGS. 25-34 is attached directly to any one of a variety of different types of movable platforms 108. Such movable platforms 108 are capable of positioning the continuity tester 200 relative to a structure 300, and can include a robotic device 110, a robotic arm 112, a machine 115 (FIGS. 29-30) such as a computer numerical control (CNC) machine 116 (FIGS. 29-30), or other types of movable platforms 108. Similar to the operation of the above-described end effector version of the continuity tester 200, the continuity tester 200 of FIGS. 25-34 is configured to determine the existence of an uninterrupted electrical path 216 (FIG. 8) between the structure 300 and a fastener 400 installed in the structure 300. In this regard, any one or more of the components, operations, functionalities, and/or capabilities of the examples described above and/or shown in FIGS. 1-23 are applicable to the continuity testing system 250 and method of FIGS. 24-35.

Figure 24:
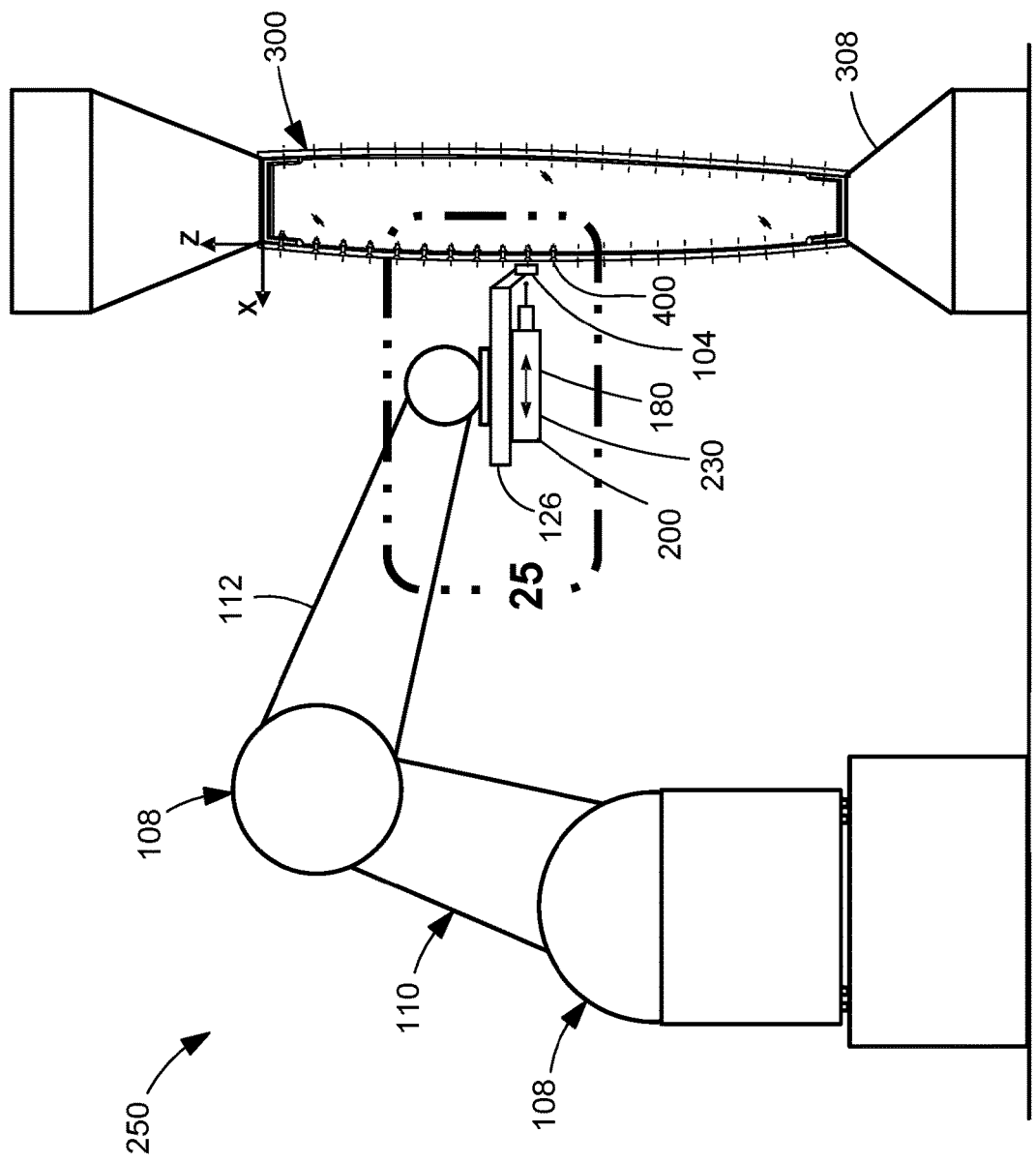
FIG. 24 is a side view of an example of a continuity testing system in which the continuity tester is integrated into a process tool attached directly to a robotic arm of a robotic device.
Figure 26:
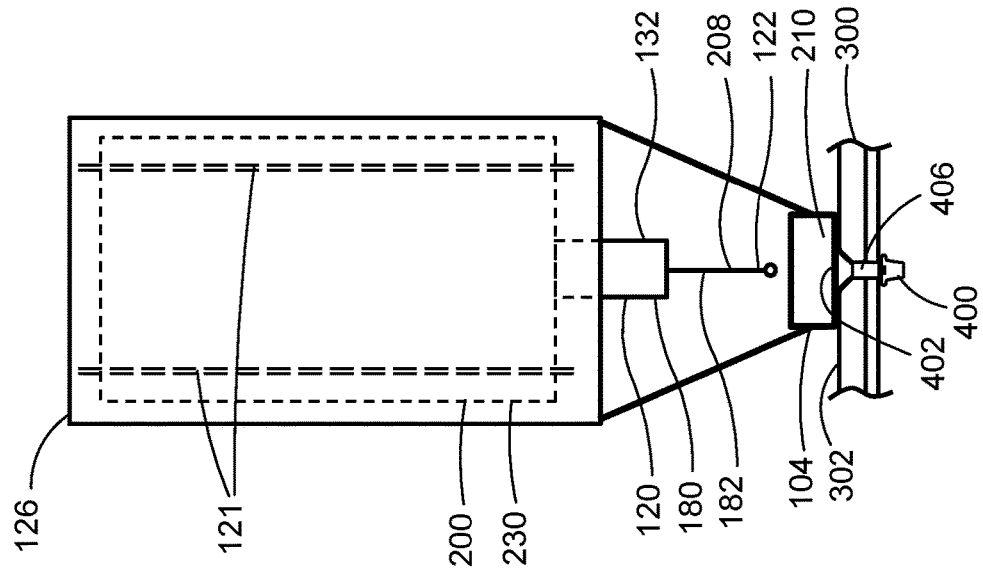
FIG. 26 is a top view of the touch-off probe taken along line 26-26 of FIG. 25.
Figure 25:
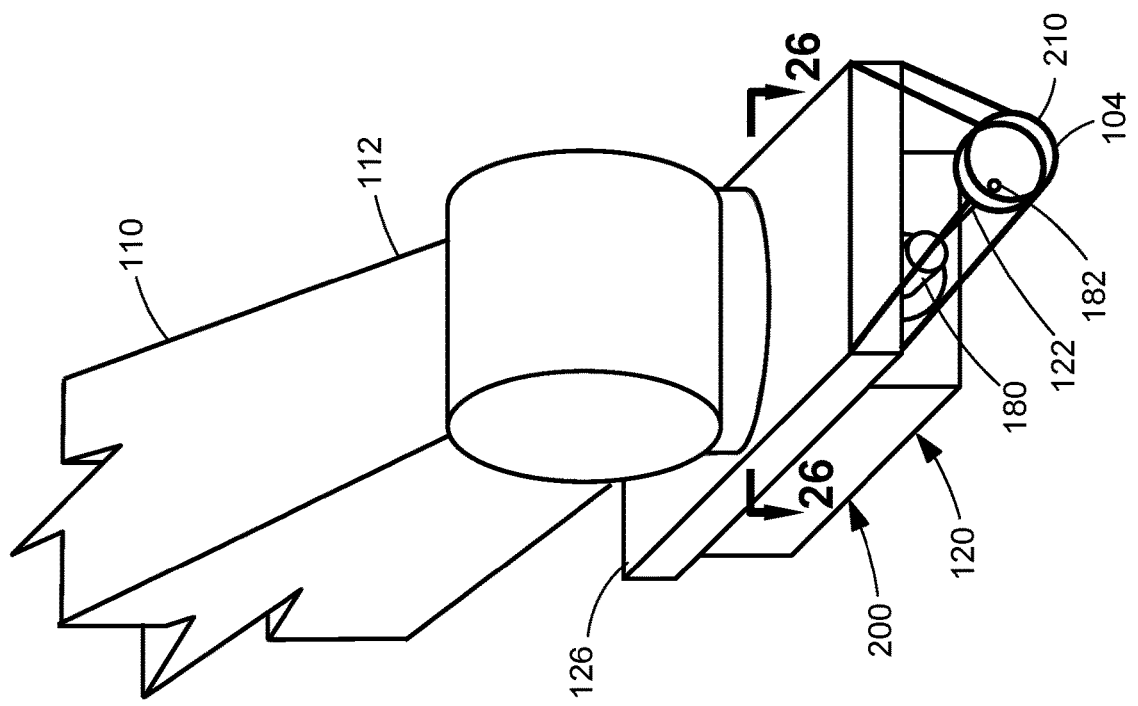
FIG. 25 is a top-down perspective view of an example of a process tool configured as a touch-off probe into which the continuity tester is integrated.

Referring to FIGS. 24-26 and 29-32, shown are examples of the continuity testing system 250 in which the continuity tester 200 is integrated into a process tool 120 that is attached directly to a movable platform 108 with no intermediate structural member such as the above-described end effector frame 102 of FIGS. 1-8 and 11-22. In the example of FIGS. 24-26, the process tool 120 is mounted directly to a robotic device 110. In the example shown, the process tool 120 is mounted to the end of a robotic arm 112 of the robotic device 110. The robotic device 110 of FIGS. 24-25 has any one or more of the components and/or functionalities of the above-described robotic device 110 of FIGS. 1-2. However, in other examples of the continuity testing system 250, a process tool 120 can be mounted to other locations on a robotic device 110, and is not limited to being mounted on a robotic arm 112. FIGS. 29-32 shown an alternative example of the continuity testing system 250 in which the process tool 120 is mounted directly to a CNC machine 116 as described in greater detail below.

In FIGS. 24-26 and 29-32, the process tool 120 is shown mounted to a tool carrier 126. The tool carrier 126 is directly coupled to the robotic device 110, such as to the robotic arm 112. Similar to the above-described tool carrier 126 arrangement of FIGS. 3-7, 11, 13, and 15, the process tool 120 of FIGS. 24-26 and 29-32 is movable along process tool tracks 121 between a retracted position 132 (e.g., FIG. 26) in which the working end 122 of the process tool 120 is spaced apart from the structure 300, and an extended position 134 (FIG. 6) in which the working end 122 of the process tool 120 is engaged with the structure 300 and/or a fastener 400 during or after installation. In some examples, the tool carrier 126 includes a servomotor (not shown) for moving the process tool 120 between the retracted position 132 and the extended position 134. However, in other examples not shown, the process tool 120 can be mounted directly to the robotic device 110, such as to the robotic arm 112, without any tool carrier 126 between the process tool 120 and the robotic arm 112.

In the continuity testing system 250 of FIGS. 24-34, the continuity tester 200 is configured to determine the existence of an uninterrupted electrical path 216 between the structure 300 and a fastener 400. Similar to the above-described arrangement of FIGS. 1-22, the continuity tester 200 of FIGS. 24-34 has a first test lead 208 and a second test lead 210. The first test lead 208 is configured to be placed in contact with the fastener head 402 of a fastener 400 in the structure 300. The second test lead 210 is configured to be placed in contact with the frontside surface 302 of the structure 300 at a location adjacent to the fastener 400.

In the continuity testing system 250 of FIGS. 24-34, the process tool 120 has any one or more functional capabilities for operating on a structure 300. For example, the process tool 120 can have any one or more functionalities associated with formation of a hole 406 in the structure 300 and/or installation of a fastener 400, as described above and shown in FIGS. 3, 4, 7, 11, 13 and 15. For example, the process tool 120 can be a spindle 150 configured to rotatably drive a spindle tool 152 for forming a hole 406 in the structure 300, as shown in above-described FIGS. 11-12. In another example, the process tool 120 can be a hole probe 160 configured to measure at least one characteristic associated with a hole 406 in the structure 300, as shown in above-described FIGS. 13-14. In a still further example, the process tool 120 can be a fastener installer 170 configured to install a fastener 400 in a hole 406 in the structure 300, as shown in above-described FIGS. 15-17. In yet another example, the process tool 120 can also be a touch-off probe 180 configured to measure at least one characteristic associated with a fastener 400 installed in the structure 300. As shown in above-described FIGS. 7-10, the touch-off probe 180 is configured to measure the flushness or protrusion of a fastener head 402 relative to a frontside surface 302 of the structure 300, among one or more other capabilities of the touch-off probe 180.

As mentioned above, each process tool 120 has a working end 122 configured to engage with the structure 300 and/or a fastener 400, such as during hole formation and/or fastener installation. For the arrangement of FIGS. 25-26 and 31-32, the first test lead 208 of the continuity tester 200 is integrated into the working end 122 of the process tool 120, and the second test lead 210 is integrated into a nose piece 104 that is configured to be placed in contact with a frontside surface 302 of the structure 300, such as during hole formation and/or fastener installation, similar to the above-described nose piece 104 of FIGS. 5-8. In the example of FIGS. 25-26 and 31-32, the nose piece 104 is mounted to the tool carrier 126. In an alternative arrangement (not shown) in which the tool carrier 126 is omitted, the nose piece 104 can be coupled to the process tool 120 or to the movable platform 108, such as to the end of the robotic arm 112. In still other examples not shown, the nose piece 104 can be omitted, and any one of a variety of alternative structural elements can be provided to function as a second test lead 210 for contacting the frontside surface 302 of the structure 300 for the integrated version of the continuity tester 200.

In FIGS. 25-26 and 31-32, the continuity tester 200 includes a voltage source 204 (FIG. 8) for applying a voltage signal 206 (FIG. 8) to the fastener head 402 via the first test lead 208 (e.g., the probe element 182). Similar to the above-described arrangement in FIG. 8, the voltage signal 206 is applied to the fastener head 402. For example, in FIGS. 25-26 and 31-32, after inspection of the flushness of a fastener head 402 via the touch-off probe 180, the voltage source 204 is activated, causing a voltage signal 206 to be applied to the fastener head 402 via the probe element 182 while in contact with the fastener head 402. In this regard, the probe element 182 functions as the first test lead 208 of the continuity tester 200. The nose piece 104 functions as the second test lead 210 of the continuity tester 200, and is in contact with the frontside surface 302 of the structure 300, such that if an uninterrupted electrical path 216 exists between the fastener 400 and the structure 300, the voltage signal 206 passes into the nose piece 104 and flows back to the continuity tester 200.

Although not shown in FIGS. 24-34, the continuity testing system 250 has an indicator 218 (FIG. 8) configured to indicate either the existence or absence of an electrical path 216 between the fastener 400 and the structure 300. In this regard, the indicator 218 can be configured similar to any one or more of the arrangements described above and/or shown in FIG. 9. In some examples of the continuity testing system 250 of FIGS. 24-34, the continuity tester 200 is an ohmmeter 230 configured to measure the magnitude of electrical resistance of the electrical path 216 between the fastener 400 and the structure 300. As described above and shown in FIG. 10, the ohmmeter 230 can include an indicator 218 for displaying the magnitude of the electrical resistance on a display screen (not shown), such as in real time. Alternatively or additionally, the ohmmeter 230 can transmit the electrical resistance measurement to a processor (not shown) where it is recorded, along with the three-dimensional coordinates of the fastener 400.

Referring to FIGS. 27-28, shown is an example of the continuity testing system 250 in which the continuity tester 200 is a standalone continuity tester module 202 mounted directly to the movable platform 108. In the example shown, the continuity tester module 202 is mounted to the end of a robotic arm 112. More specifically, the continuity tester module 202 is mounted to a tool carrier 126 which, in turn, is mounted to the robotic arm 112. The tool carrier 126 arrangement shown in FIGS. 27-28 has the same components and same functionality as the tool carrier 126 arrangement described above. In some examples, the tool carrier 126 can be omitted, and the continuity tester module 202 can be mounted directly to the robotic device 110.

Similar to the above-described arrangement shown in FIGS. 20-22, the continuity tester module 202 of FIGS. 27-28 has a dedicated first test lead 208 and a dedicated second test lead 210 configured to be placed in contact respectively with a fastener head 402 of the fastener 400 and a frontside surface 302 of the structure 300 containing the fastener 400. Although not shown in FIGS. 27-28, the first test lead 208 and the second test lead 210 optionally include test lead tips 212 (FIG. 22) that are spring loaded via a compression spring 214 as shown in FIGS. 21-22. The continuity tester module 202 of FIGS. 27-28 includes a voltage source 204 (FIG. 21) for applying a voltage signal 206 (FIG. 21) to the fastener head 402 via the first test lead 208, and the second test lead 210 is configured to receives the voltage signal 206 if an electrical path 216 exists between the fastener 400 and the structure 300. Although not shown in FIGS. 27-28, the continuity tester module 202 has an indicator 218 (FIG. 21) to provide an indication of either the existence or the absence of an electrical path 216 between the fastener 400 and the structure 300.

The continuity tester module 202 of FIGS. 27-28 can be provided as a standalone ohmmeter module 228 (e.g., a milliohm meter module) mounted directly to a movable platform 108 such as the robotic arm 112. The ohmmeter module 228 is configured to measure the magnitude of electrical resistance of the electrical path 216 between each fastener 400 and the structure 300 similar to the above-described arrangement of FIG. 21. Similar to the above-described operation of the continuity tester module 202 of FIG. 21, the ohmmeter module 228 includes a voltage source 204 (FIG. 21) for applying a voltage signal 206 (FIG. 21) to the fastener head 402 via the first test lead 208, and the second test lead 210 receives the voltage signal 206 if an electrical path 216 exists between the fastener 400 and the structure 300. The ohmmeter module 228 measures the magnitude of electrical resistance of the electrical path 216, and can include an indicator 218 (e.g., FIG. 21) for displaying the magnitude of the electrical resistance on a display screen. As described above, the ohmmeter module 228 can transmit the electrical resistance measurement to a processor (not shown) where it is recorded, along with the three-dimensional coordinates of the fastener 400. The ohmmeter module 228 can be a milliohmmeter module 228 configured to measure electrical resistance on the order of 0.001 ohm (1 milliohm).

Figure 29:
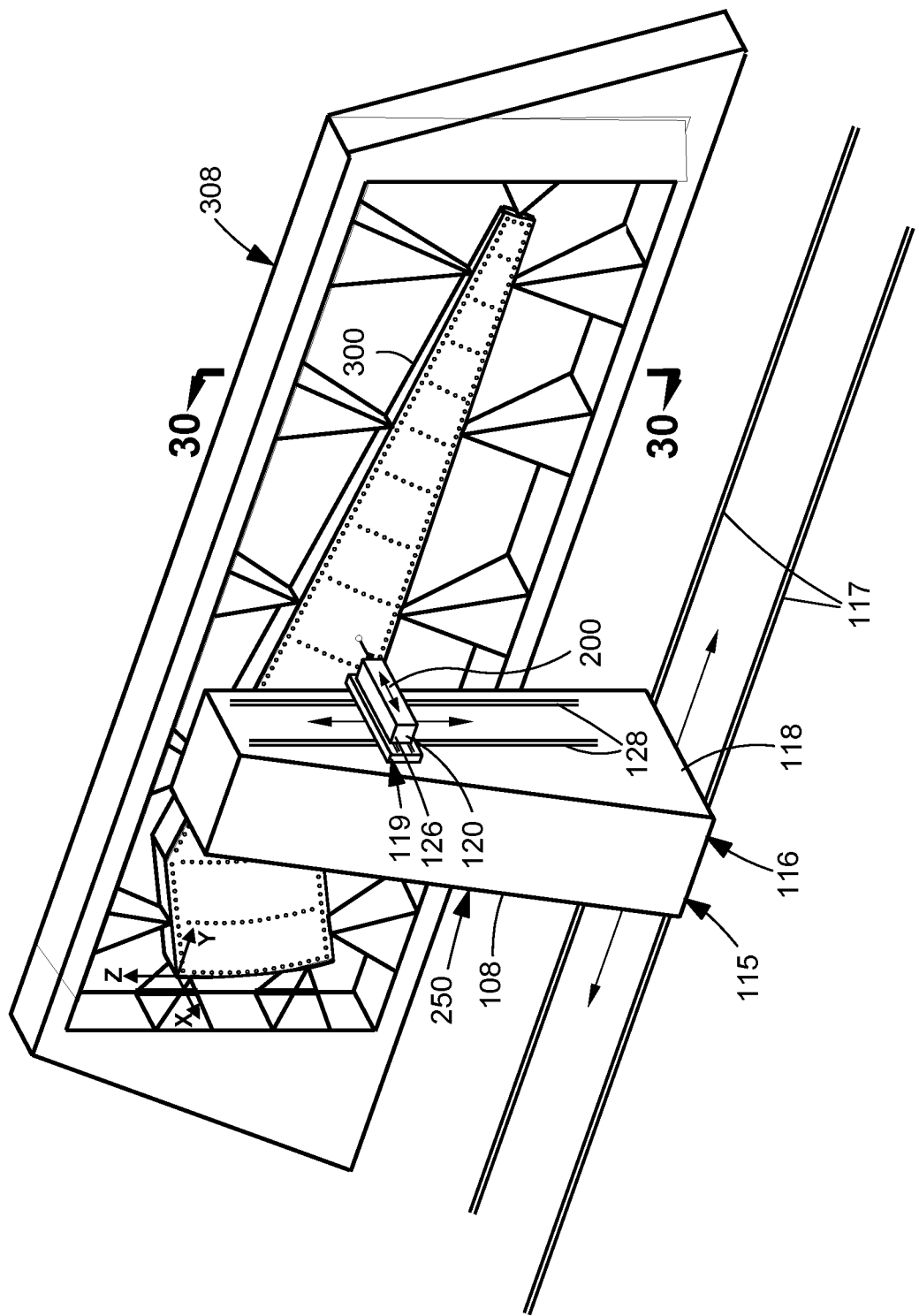
FIG. 29 is a perspective view of an example of a continuity testing system in which the continuity tester is integrated into a computer numerical control (CNC) machine.
Figure 30:
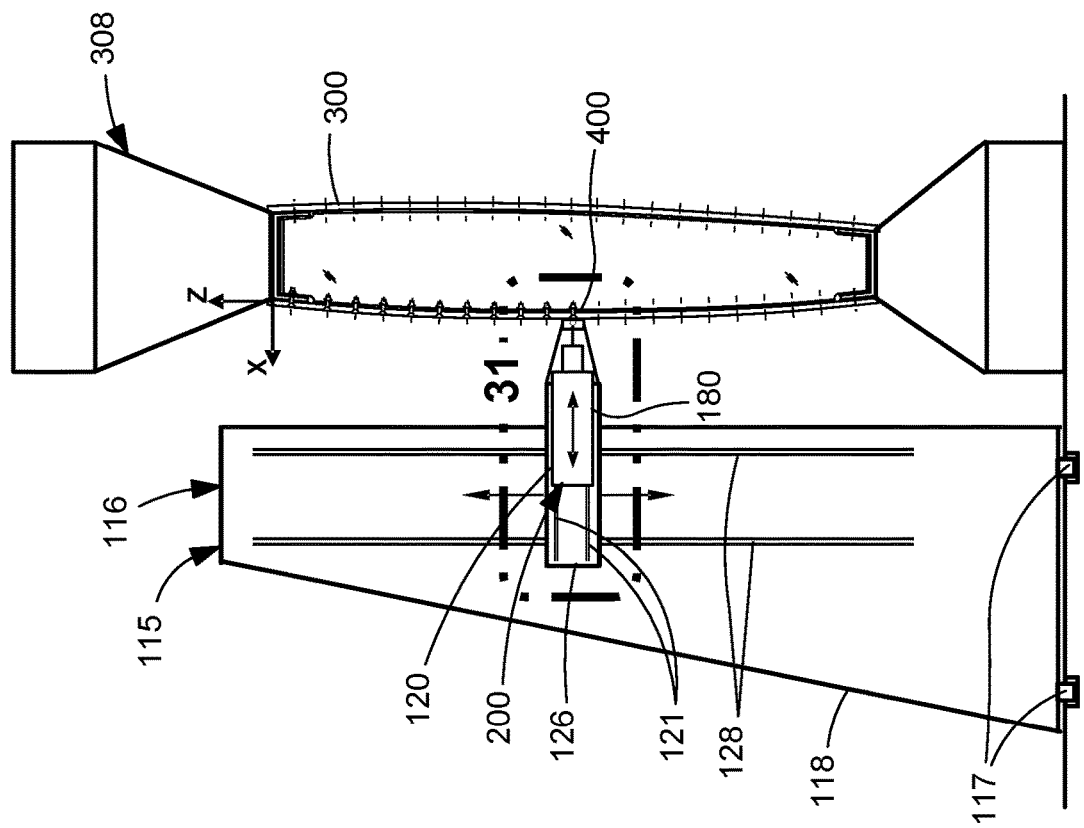
FIG. 30 is a side view of the continuity testing system taken along line 30-30 of FIG. 29.
Figure 32:
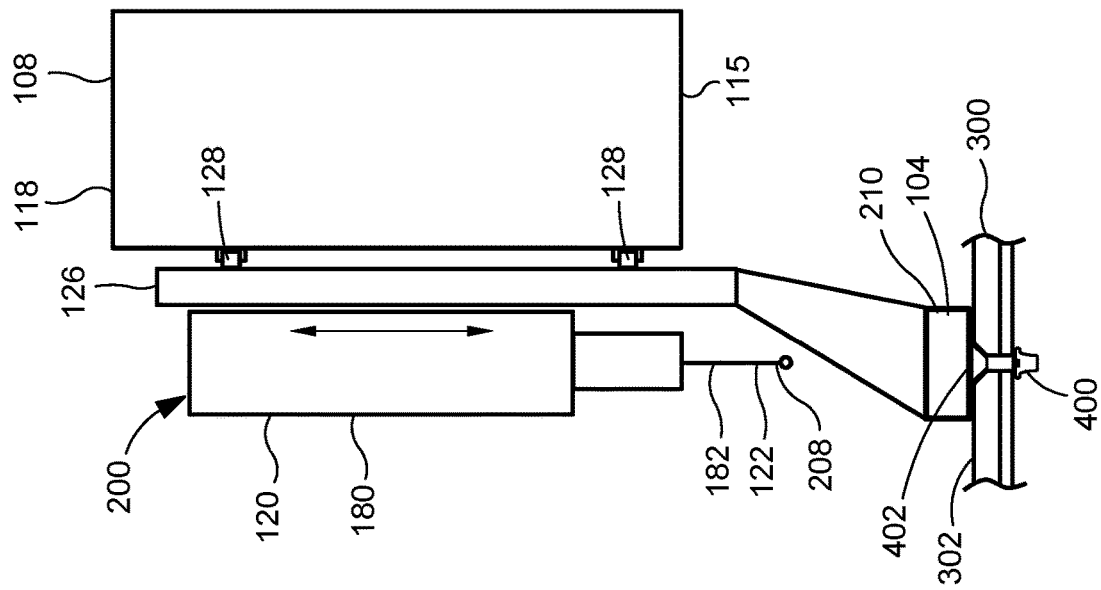
FIG. 32 is a top view of the touch-off probe taken along line 32-32 of FIG. 31.
Figure 31:
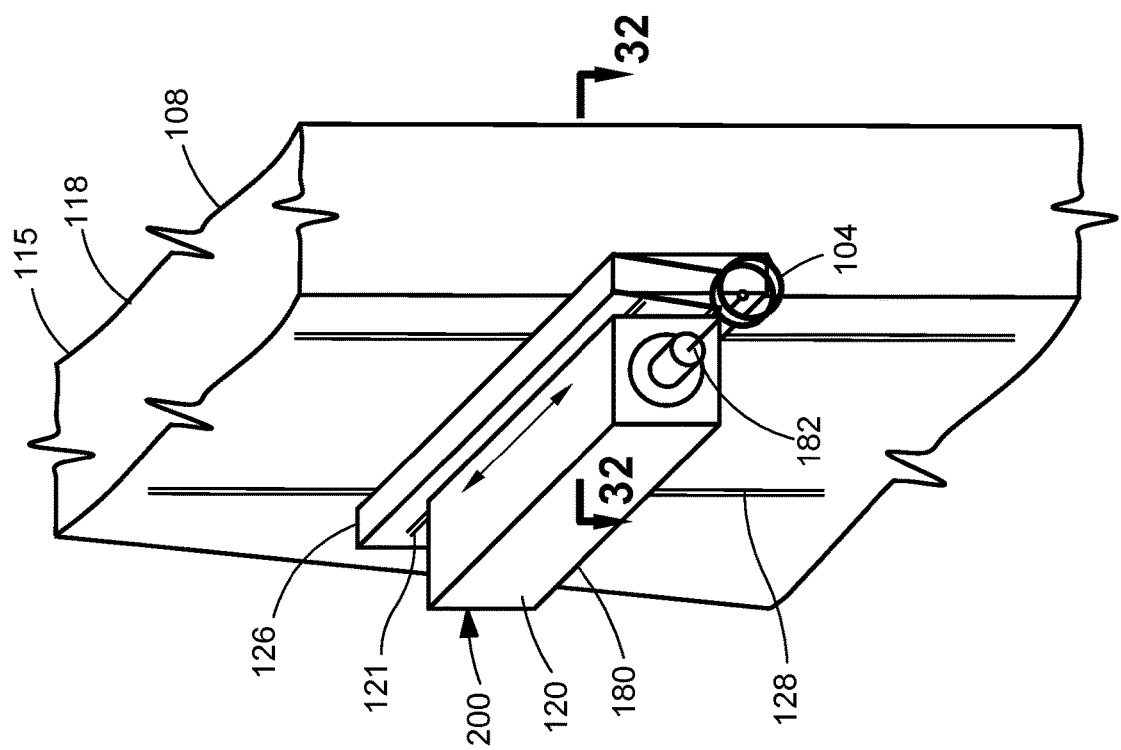
FIG. 31 is a top-down perspective view of the process tool configured as a touch-off probe into which the continuity tester is integrated.
Figure 34:
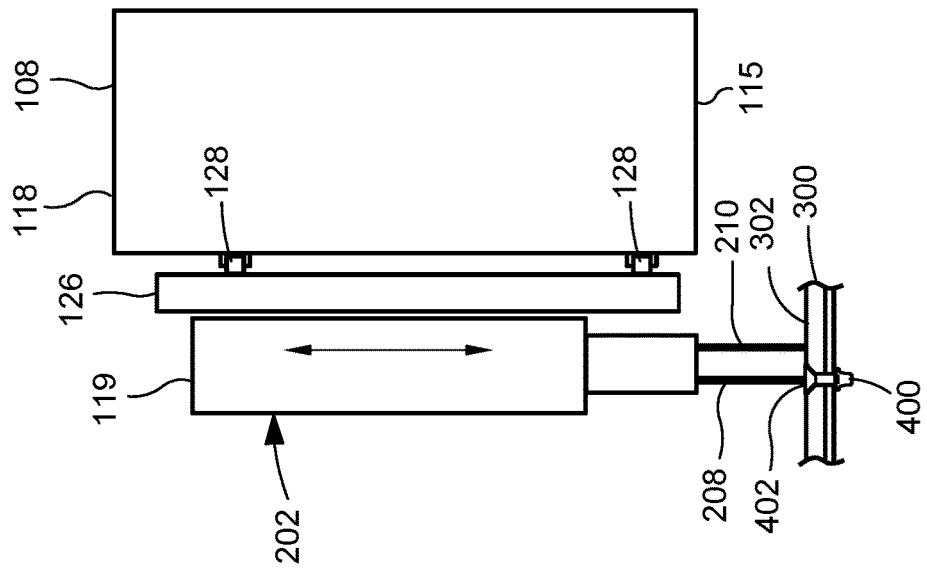
FIG. 34 is a top view of the standalone continuity tester module taken along line 34-34 of FIG. 33.
Figure 33:
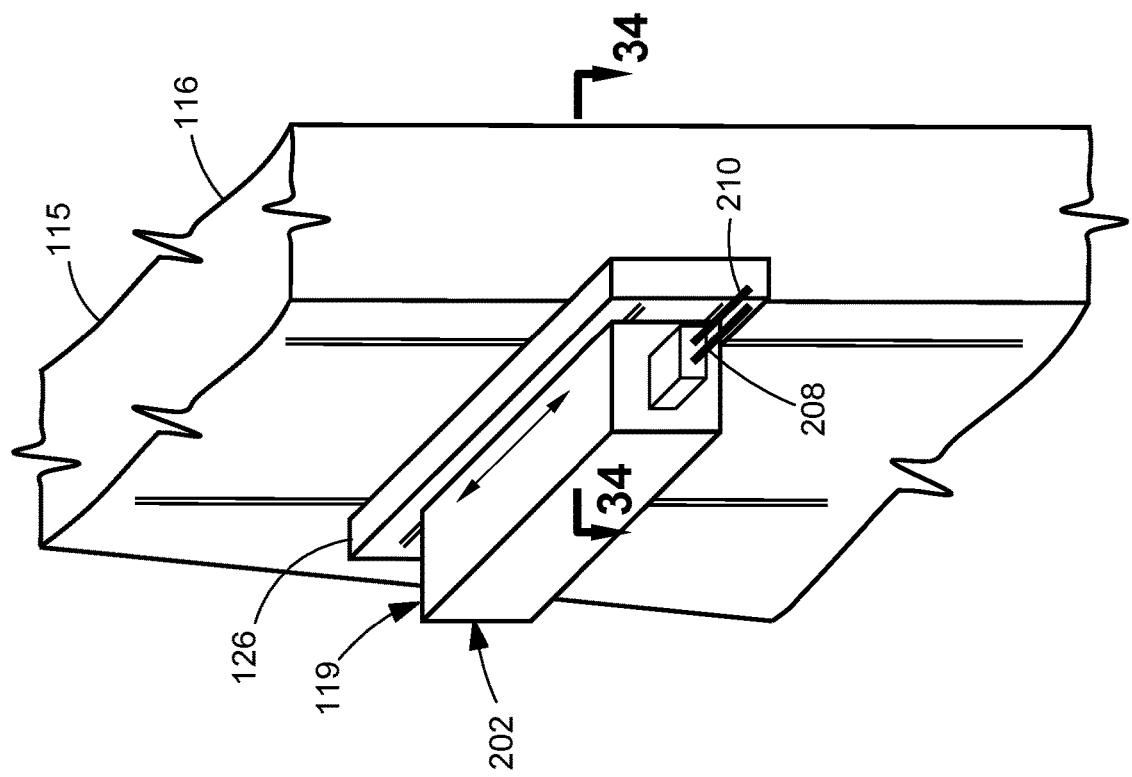
FIG. 33 is a top-down perspective view of an example of a standalone continuity tester module attached directly to the CNC machine.

Referring to FIGS. 29-34, shown is an example of the continuity testing system 250 in which the continuity tester 200 is mounted to a machine 115. For example, FIGS. 29-32 show the continuity tester 200 integrated into a process tool 120 which is mounted directly to a CNC machine 116. The machine 115 (e.g., CNC machine 116) can be partially or fully supported by the factory floor, and/or by the factory ceiling, and/or by the assembly fixture 308 that holds the structure 300 that is being worked on. For example in FIGS. 29-30, the machine 115 (e.g., CNC machine 116) has a vertically oriented main frame 118 that is movable along machine tracks 117 installed in the factory floor. The main frame 118 supports a machine head 119 which includes the continuity tester 200 which, as mentioned above, can be integrated into a process tool 120 as shown in FIG. 30-32. Alternatively, the continuity tester 200 can be a standalone continuity tester module 202 as shown in FIGS. 33-34 and described above. Although the machine 115 (e.g., CNC machine 116) is shown in FIGS. 29-30 as having a vertically oriented main frame 118, the main frame 118 can also be horizontally oriented (not shown) or provided in any one of a variety of alternative arrangements. The machine 115 includes vertically oriented tool carrier tracks 128 allowing for movement of the tool carrier 126 along the main frame 118.

Referring to FIGS. 31-32, shown is an example of the process tool 120 configured as a touch-off probe 180. The touch-off probe 180 is coupled to a tool carrier 126 which allows the touch-off probe 180 to move along process tool tracks 121 between the retracted position 132 and the extended position 134 as described above for FIGS. 25-26. However, in other examples not shown, the process tool 120 can be mounted directly to the machine 115, such as directly to the main frame 118, without any tool carrier 126 between the process tool 120 and the main frame 118.

Similar to the above-described arrangement of FIGS. 25-26, the process tool 120 (e.g., the touch-off probe 180) of FIGS. 31-32 has a working end 122 (e.g., a probe element 182) configured to engage with the structure 300 and/or a fastener 400, and the first test lead 208 of the continuity tester 200 is integrated into the working end 122 of the process tool 120. The second test lead 210 is integrated into a nose piece 104 that can be included with the process tool 120, and which is placed in contact with a frontside surface 302 of the structure 300, such as during hole formation and/or fastener installation, similar to the above-described nose piece 104 of FIGS. 5-8. However, in some examples not shown, the nose piece 104 can be omitted, and any one of a variety of alternative structural elements can be provided to function as a second test lead 210 for contacting the frontside surface 302 of the structure 300. Although not shown, a voltage source 204 (e.g., FIG. 8) applies a voltage signal 206 (FIG. 8) to the fastener head 402 via the first test lead 208 (e.g., the probe element 182), and if an uninterrupted electrical path 216 (FIG. 8) exists between the fastener 400 and the structure 300, the voltage signal 206 passes into the nose piece 104 and flows back to the continuity tester 200. An indicator 218 (FIG. 8) can indicate the existence or absence of the electrical path 216 as described above. The continuity tester 200 can optionally be configured as an ohmmeter 230 as described above for FIGS. 25-26.

Referring to FIGS. 33-34, shown is an example of a standalone continuity tester module 202 attached directly to the CNC machine 116. The continuity tester module 202 forms part of the machine head 119, which can optionally include the tool carrier 126 as described above for FIGS. 31-32. The continuity tester module 202 of FIG. 33-34 includes any one or more of the components and/or functionality of the continuity tester module 202 described above for FIGS. 21-22.

Figure 35:
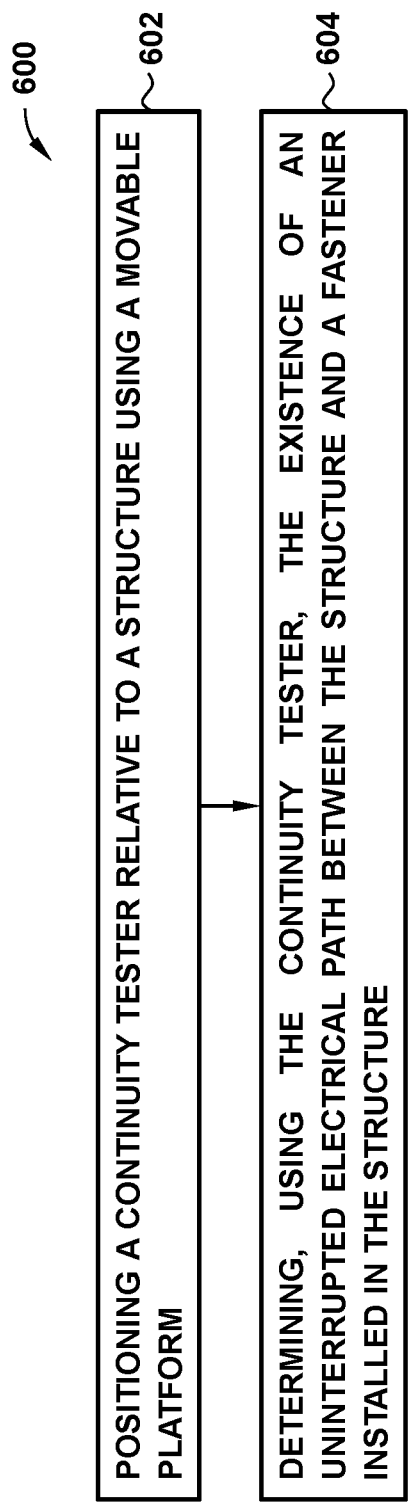
FIG. 35 is a flowchart of operations included in a method of testing the electrical continuity between a structure and a fastener using a continuity tester attached directly to a movable platform.

Referring to FIG. 35, shown is an example of a method 600 of testing electrical continuity between a structure 300 and a fastener 400 installed in the structure 300. As mentioned above, any one or more of the steps of the method 600 can include any one or more of the above-described steps, in whole or in part, of the method 500 of FIG. 23.

Step 602 of the method 600 comprises positioning a continuity tester 200 relative to a structure 300 using a movable platform 108. For example, step 602 can include positioning the continuity tester 200 relative to the structure 300 using a robotic device 110 and/or a robotic arm 112 to which the continuity tester 200 is directly attached, as shown in FIGS. 24-28. In another example, step 602 can include positioning the continuity tester 200 relative to the structure 300 using a machine 115, such as a CNC machine 116 as shown in FIGS. 29-34.

Step 604 of the method 600 comprises determining, using the continuity tester 200, the existence of an uninterrupted electrical path 216 between the structure 300 and a fastener 400 installed in the structure 300. In this regard, step 604 comprises placing a first test lead 208 in contact with a fastener head 402 of the fastener 400, placing a second test lead 210 in contact with a frontside surface 302 of the structure 300 at a location adjacent to the fastener 400, and injecting, using the continuity tester 200, a voltage signal 206 into the fastener 400 via the first test lead 208 in the same manner as described above with regard to step 504 of the method 500.

For examples in which the continuity tester 200 is integrated into a process tool 120 directly mounted to a movable platform 108, the step of placing the first test lead 208 in contact with the fastener head 402 comprises placing a working end 122 of the process tool 120 in contact with the fastener head 402. As described above, the working end 122 is electrically connected to the continuity tester 200. Placing the working end 122 of the process tool 120 in contact with the fastener head 402 can comprise placing a probe element 182 of a touch-off probe 180 in contact with a fastener head 402 of the fastener 400. As mentioned above, the touch-off probe 180 is configured to measure at least one characteristic associated with the fastener 400 installed in the structure 300, such as the flushness of the fastener head 402 of a countersunk fastener 408. Alternatively, in other examples, the method 600 can include placing a spindle tool 152 of a spindle 150 in contact with a fastener head 402, or placing a hole probe 160 in contact with a fastener head 402, or placing a fastener installer 170 in contact with a fastener head 402, as described above. The step of placing the second test lead 210 in contact with the frontside surface 302 can include placing a nose piece 104 of the process tool 120 in contact with the frontside surface 302, such as during hole formation and/or fastener installation. As mentioned above and shown in FIG. 9, the nose piece 104 is electrically connected to the continuity tester 200.

In one example, step 604 comprises measuring, using an ohmmeter 230, the magnitude of electrical resistance of the electrical path 216 between the fastener 400 and the structure 300. As described above, step 604 of determining the existence of an uninterrupted electrical path 216 between the fastener 400 and the structure 300 comprises placing a first test lead 208 and a second test lead 210 of the continuity tester module 202 in contact respectively with the fastener head 402 and the frontside surface 302 of the structure 300 containing the fastener 400. The ohmmeter 230 can be integrated into a process tool 120 as described above. Alternatively, the ohmmeter 230 can be a standalone ohmmeter module 228 mounted directly to the movable platform 108. In this regard, the continuity tester 200 can be a continuity tester module 202 mounted directly to the movable platform 108.

Many modifications and other versions and examples of the disclosure will come to mind to one skilled in the art to which this disclosure pertains having the benefit of the teachings presented in the foregoing descriptions and the associated drawings 110. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. An end effector, comprising:
    an end effector frame configured to be mounted to a movable platform capable of positioning the end effector relative to a structure;
    a plurality of process tools mounted to the end effector frame and having different functional capabilities associated with hole formation and fastener installation in the structure; and
    a continuity tester configured to determine the existence of an uninterrupted electrical path between a fastener and the structure after installation of the fastener.

2. The end effector of claim 1, wherein:
    the continuity tester is an ohmmeter configured to measure a magnitude of electrical resistance of the electrical path between the fastener and the structure.

3. The end effector of claim 1, wherein:
    each fastener has a fastener head;
    the structure has a frontside surface;
    the continuity tester has a first test lead and a second test lead;
    the first test lead is configured to be placed in contact with the fastener head of a fastener installed in the structure; and the second test lead is configured to be placed in contact with the frontside surface at a location adjacent to the fastener in the structure.

4. The end effector of claim 3, wherein:
each process tool has a working end configured to engage with at least one of the structure and the fastener during at least one of hole formation and fastener installation; and
the first test lead is integrated into the working end of at least one of the process tools.

5. The end effector of claim 4, wherein the process tools comprise at least one of the following:
a spindle configured to rotatably drive a spindle tool for forming a hole in the structure;
a hole probe configured to measure at least one characteristic associated with a hole in the structure;
a fastener installer configured to install a fastener in a hole in the structure; and
a touch-off probe configured to measure at least one characteristic associated with a fastener installed in the structure.

6. The end effector of claim 5, wherein:
the touch-off probe is configured to measure flushness or protrusion of a fastener head relative to a frontside surface of the structure containing the fastener.

7. The end effector of claim 3, wherein:
the end effector frame has a nose piece configured to be placed in contact with a frontside surface of the structure during hole formation and fastener installation; and
the second test lead is integrated into the nose piece.

8. The end effector of claim 1, wherein:
the continuity tester is a standalone continuity tester module mounted to the end effector frame adjacent to the process tools; and
the continuity tester module has a first test lead and a second test lead configured to be placed in contact respectively with a fastener head of the fastener and a frontside surface of the structure containing the fastener.

9. The end effector of claim 1, wherein:
the end effector frame is configured to be mounted to a movable platform comprising a robotic device.

10. An end effector, comprising:
an end effector frame configured to be mounted to a movable platform capable of positioning the end effector relative to a structure;
a plurality of process tools mounted to the end effector frame and having different functional capabilities associated with hole formation and fastener installation in the structure; and
a standalone ohmmeter module mounted to the end effector frame adjacent to the process tools and configured to measure a magnitude of electrical resistance of an electrical path between each fastener and the structure after installation of the fastener.

11. The end effector of claim 10, wherein:
the end effector frame has a nose piece configured to be placed in contact with a frontside surface of the structure during hole formation and fastener installation; and
at least some of the process tools and the ohmmeter module have a tool axis and are arranged in side-by-side relation to each other in the end effector frame and are movable along a shuttle axis perpendicular to the tool axes for one-at-a-time engagement with the structure.

12. A method of testing electrical continuity between a structure and a fastener installed in the structure, comprising:
positioning an end effector relative to a structure using a movable platform;
performing, using one or more process tools mounted to the end effector, one or more operations associated with at least one of hole formation and fastener installation in the structure; and
determining, using a continuity tester included with the end effector, the existence of an uninterrupted electrical path between a fastener and the structure after installation of the fastener.

13. The method of claim 12, wherein determining the existence of an uninterrupted electrical path between the fastener and the structure comprises:
measuring, using an ohmmeter, a magnitude of electrical resistance of the electrical path between the fastener and the structure.

14. The method of claim 12, wherein determining the existence of an uninterrupted electrical path between the fastener and the structure comprises:
placing a first test lead in contact with a fastener head of the fastener;
placing a second test lead in contact with a frontside surface of the structure at a location adjacent to the fastener; and
injecting, using the continuity tester, a voltage signal into the fastener via the first test lead.

15. The method of claim 14, wherein placing the first test lead in contact with the fastener head comprises:
placing a working end of one of the process tools in contact with the fastener head, the working end is electrically connected to the continuity tester.

16. The method of claim 15, wherein placing the working end of one of the process tools in contact with the fastener head comprises:
placing the working end of one of the following process tools in contact with the fastener head:
a spindle configured to rotatably drive a spindle tool for forming a hole in the structure;
a hole probe configured to measure at least one characteristic associated with a hole in the structure;
a fastener installer configured to install a fastener in a hole in the structure; and
a touch-off probe configured to measure at least one characteristic associated with the fastener installed in the structure.

17. The method of claim 16, wherein placing the working end of one of the process tools in contact with the fastener head comprises:
placing the working end of the touch-off probe in contact with the fastener head either before or after measuring flushness or protrusion of the fastener head relative to the frontside surface using the touch-off probe.

18. The method of claim 14, wherein placing the second test lead in contact with the frontside surface comprises:
placing a nose piece of the end effector in contact with the frontside surface for restricting movement of the end effector relative to the structure during hole formation and fastener installation, the nose piece is electrically connected to the continuity tester.

19. The method of claim 12, wherein determining the existence of an uninterrupted electrical path between the fastener and the structure comprises:
placing a first test lead and a second test lead of a continuity tester module in contact respectively with a fastener head of the fastener and a frontside surface of the structure containing the fastener; and wherein the continuity tester is a standalone continuity tester module mounted to the end effector adjacent to the process tools.

20. The method of claim 12, wherein positioning the end effector relative to the structure using the movable platform comprises:

positioning the end effector relative to the structure using a robotic device.

* * * * *